United States Patent
Arahira

(10) Patent No.: US 8,149,501 B2
(45) Date of Patent: Apr. 3, 2012

(54) QUANTUM ENTANGLED PHOTON PAIR GENERATING DEVICE

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 134 days.

(21) Appl. No.: 12/801,495

(22) Filed: Jun. 11, 2010

(65) Prior Publication Data

US 2011/0051227 A1 Mar. 3, 2011

(30) Foreign Application Priority Data

Aug. 26, 2009 (JP) ................................. 2009-195800

(51) Int. Cl.
*G02F 1/35* (2006.01)
(52) U.S. Cl. ......... 359/328; 359/330; 380/256; 398/152
(58) Field of Classification Search .................. None
See application file for complete search history.

(56) References Cited

U.S. PATENT DOCUMENTS

| 2006/0153573 | A1* | 7/2006 | Tomaru | 398/152 |
| 2008/0037996 | A1* | 2/2008 | Spillane et al. | 398/152 |
| 2009/0268276 | A1* | 10/2009 | Lee et al. | 359/330 |
| 2010/0309469 | A1* | 12/2010 | Kanter et al. | 356/364 |
| 2011/0032532 | A1* | 2/2011 | Hirano et al. | 356/491 |

FOREIGN PATENT DOCUMENTS

| JP | 2003-228091 A | 8/2003 |
| JP | 2005-258232 A | 9/2005 |

OTHER PUBLICATIONS

H. C. Lim, A. Yoshizawa, H. Tsuchida, and K. Kikuchi "Stable Source of High Quality Telecom-Band Polarization-Entangled Photon-Pairs Based on a Single, Pulse-Pumped, Short PPLN Waveguide,"Optics Express, vol. 16, No. 17, Aug. 18, 2008, pp. 12460-12468.

* cited by examiner

*Primary Examiner* — Hemang Sanghavi
(74) *Attorney, Agent, or Firm* — Rabin & Berdo, P.C.

(57) ABSTRACT

Excitation light is split into two components with mutually orthogonal polarization. One component is fed clockwise and the other component is fed counterclockwise into a polarization maintaining loop. A second-order nonlinear optical medium disposed in the loop generates up-converted light from each excitation component by second harmonic generation, and generates down-converted light from the up-converted light by spontaneous parametric down conversion. A polarization manipulation unit manipulates the polarization direction of at least one of the excitation or down-converted components. The clockwise and counterclockwise components of the down-converted light are recombined and output as quantum entangled photon pairs having substantially the same wavelength as the excitation light. The optical components can be optimized for operation at this wavelength without the need to consider the shorter wavelength of the up-converted light.

16 Claims, 17 Drawing Sheets

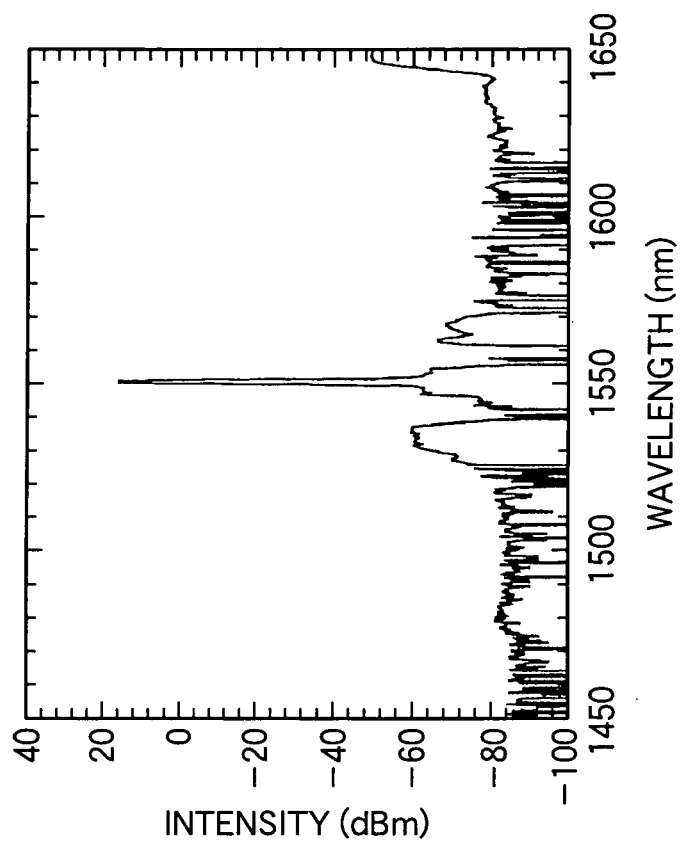
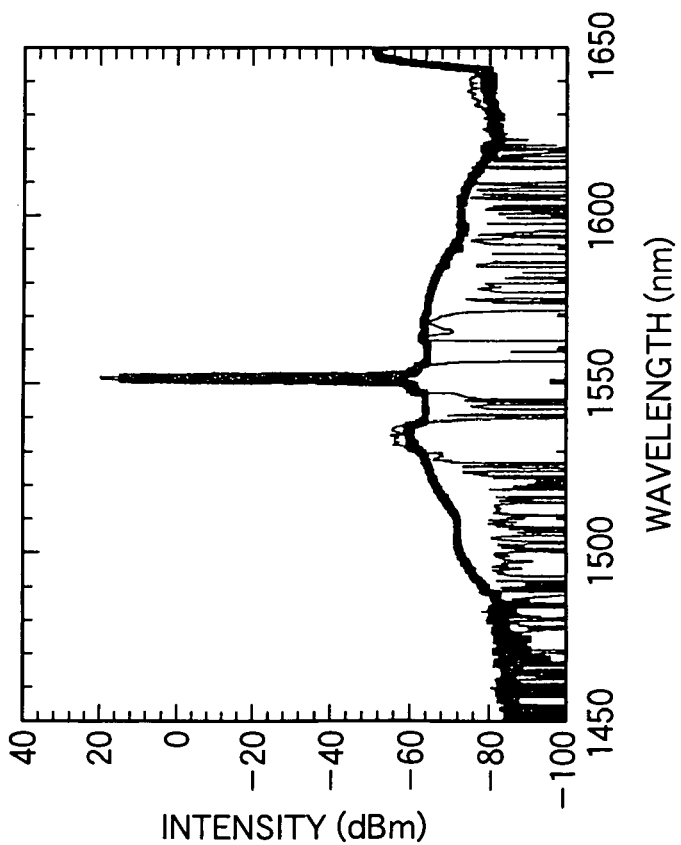

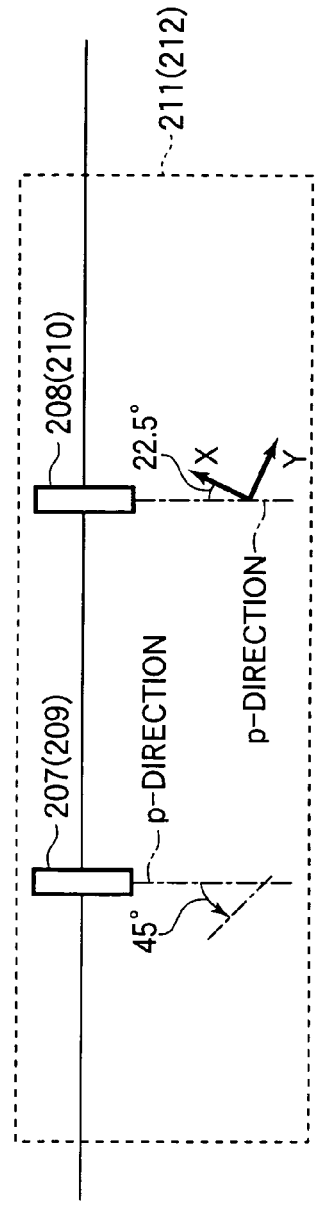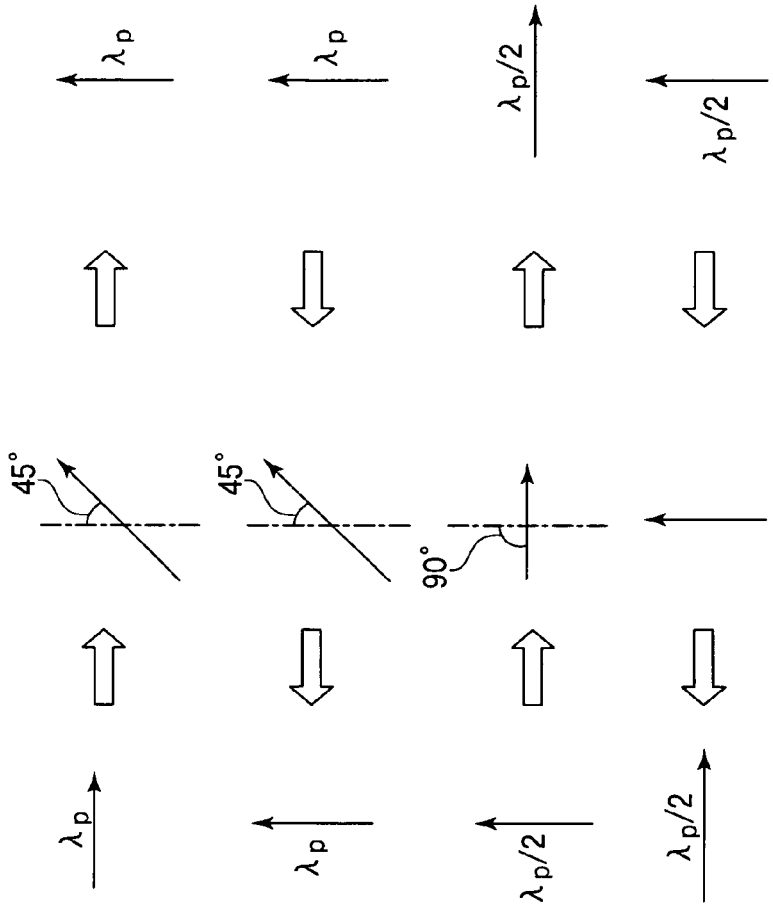

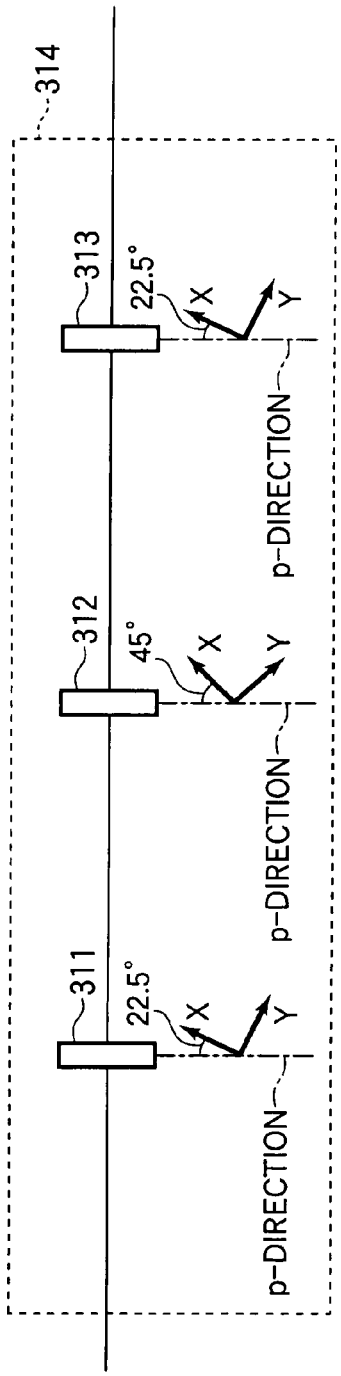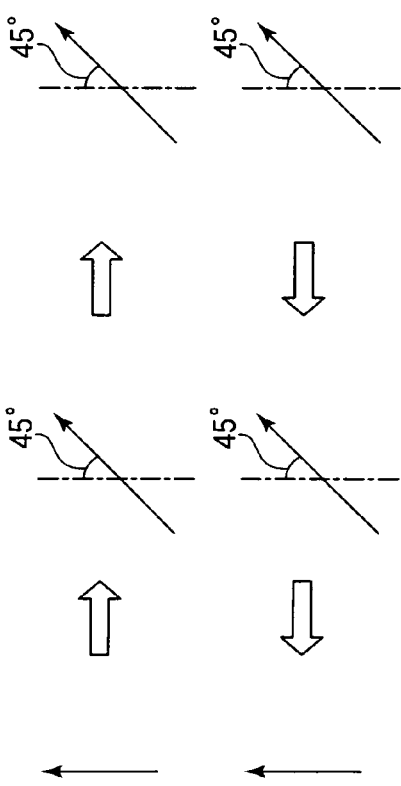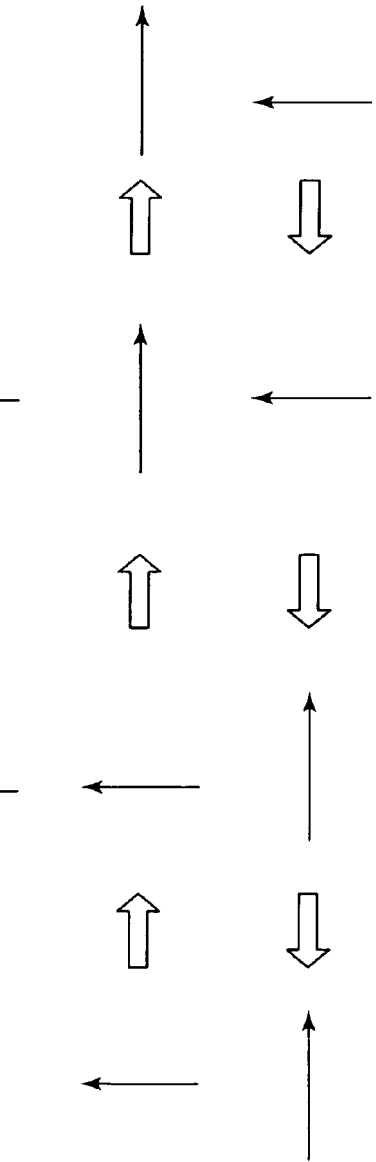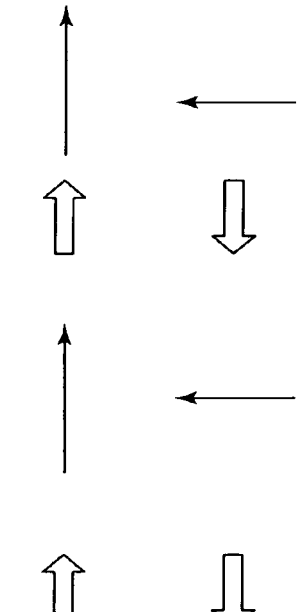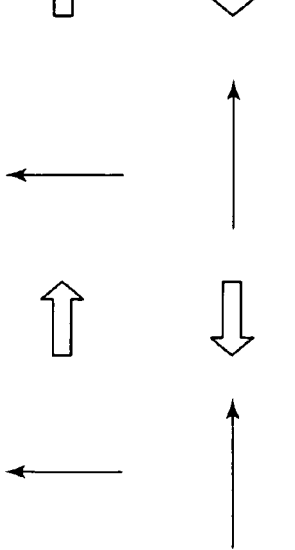
FIG.12
FIG.12A
FIG.12B
FIG.12C
FIG.12D

QUANTUM ENTANGLED PHOTON PAIR GENERATING DEVICE

BACKGROUND OF THE INVENTION

1. Field of the Invention

The present invention relates to a device for generating entangled photon pairs. The device is applicable to quantum cryptographic systems, quantum computers, and other quantum information communication systems that exploit quantum correlation of photon pairs.

2. Description of the Related Art

In recent years, information technology has reached the quantum mechanical level. Quantum cryptography and quantum computing are attracting attention. In particular, quantum cryptography, in which the security of an encryption key is guaranteed by the principles of quantum mechanics, is now regarded as the ultimate secure cryptographic communication system and has been under active research and development.

A source of quantum correlated, that is, entangled photon pairs is an essential element for realizing advanced quantum information communication systems taking advantage of the quantum nonlocality of photon pairs.

One known method for generating quantum entangled photon pairs uses spontaneous parametric down-conversion (SPDC) in a second-order nonlinear optical medium.

In U.S. Pat. No. 7,211,812 (Japanese Patent Application Publication No. 2003-228091, now Japanese Patent No. 4098530), Takeuchi describes a quantum entangled photon pair generating device using $\beta$-BaB$_2$O$_4$ (BBO) crystals as second-order nonlinear optical media. Two BBO crystals are aligned in series with a half-wave plate centered between them. Input of linearly-polarized excitation light (pump light) with a wavelength of 351.1 nm produces spontaneous parametric down conversion in the BBO crystals, generating quantum correlated photon pairs with a wavelength equal to twice the wavelength of the excitation light (equal to 702.2 nm). The two photons in each pair are referred to as the signal photon and the idler photon. The half-wave plate rotates the polarization of the photons generated in the first BBO crystal by 90°. When the intensity of the excitation light is sufficiently weak and the probability of the occurrence of spontaneous parametric down conversion in both BBO crystals simultaneously is negligible, the device outputs a signal photon beam and a spatially separated idler photon beam in which each photon in each beam has an equal probability of having been generated in each of the two BBO crystals, and its polarization state is a superposition of two states with mutually orthogonal polarization planes. The signal and idler photons in each pair are said to be polarization entangled in that both give the same result when their polarization is measured in the same way.

Many other systems using similar structures to generate quantum entangled photon pairs with wavelengths in the 700 nm to 800 nm band have been reported. Generating entangled photon pairs with wavelengths in the 1550-nm band, which is the minimum absorption loss wavelength band of optical fibers, would be very useful in anticipation of long-haul quantum information communication systems.

In Japanese Patent Application Publication No. 2005-258232, Inoue describes a 1550-nm quantum entangled photon pair generating device using a periodically poled lithium niobate (PPLN) waveguides as second-order nonlinear optical media. The device has a fiber loop structure incorporating two PPLN waveguides and a polarizing beam splitter (PBS). The two PPLN waveguides are placed so that their optical axes are mutually orthogonal. A femtosecond excitation light pulse with a wavelength of 775 nm and 45° plane polarization is input through the PBS, which splits it into photons having equal probabilities of being aligned in polarization with the axis of each PPLN waveguide. Like the BBO crystals described above, the PPLN waveguides generate quantum correlated photon pairs by spontaneous parametric down conversion, but the signal and idler photons have wavelengths of 1550 nm.

A 1550-nm wavelength quantum entangled photon pair generating device using a PBS and a polarization maintaining optical fiber loop with a single PPLN element has been described by Lim et al. in *Stable source of high quality telecom-band polarization-entangled photon-pairs based on a single, pulse-pumped, short PPLN waveguide* (Optic Express, Vol. 16, No. 17, pp. 12460 to 12468, 2008). The polarization maintaining optical fiber loop also includes a fusion splice with a 90° twist. The PPLN waveguide generates quantum correlated photon pairs including signal photons with a wavelength of 1542 nm and idler photons with a wavelength of 1562 nm by spontaneous parametric down conversion. When the intensity of the excitation light is sufficiently weak, the state of each quantum correlated photon pair output from the PBS is a superposition of a state produced by clockwise travel around the loop and an orthogonally polarized state produced by counterclockwise travel.

The essential components of these known devices are a second-order nonlinear optical medium in which the SPDC process takes place, and a source of excitation light with a wavelength approximately half the wavelength of the desired quantum entangled photon pairs. In order to obtain quantum entangled photon pairs with wavelengths in the 1550 nm band for use in optical fiber communication, a 775-nm excitation light source is needed. This leads to the following problems.

The devices described by Inoue and Lim et al. require a PBS specially designed to operate similarly at both of two greatly differing wavelengths, e.g., 775 nm and 1550 nm. The lenses and other optical elements needed for internal and external optical coupling must also be specially designed. For example, the focal length of a lens must be selected to achieve optical coupling at both the 775-nm and 1550-nm wavelengths. Anti-reflection coatings that prevent reflection at both wavelengths are also needed. Thus the known art requires optical components capable of operating with excitation light and quantum correlated photon pairs having wavelengths that differ by a factor of two.

Generally speaking, a device having equally good performance characteristics for light with greatly differing wavelengths cannot be expected to have characteristics as good as a device optimized for one of the wavelengths. More specifically, the polarization extinction ratio of a PBS and the coupling efficiency of a lens system designed for operation at both 775 nm and 1550 nm are generally inferior to the polarization extinction ratio of a PBS and the coupling efficiency of a lens system optimized for just one of these wavelengths, e.g., 1550 nm. The use of components designed to operate at both wavelengths accordingly entails an excessive loss of both input excitation light and the quantum correlated photon pairs generated for output.

A quantum information communication system using quantum entangled photon pairs deals with extremely weak light to begin with, generating single photons or photon pairs or still smaller states and transmitting an average of one photon pair or less per time slot. A structure that leads to excessive loss of light critically impairs system performance, and calls for improvement.

SUMMARY OF THE INVENTION

An object of the present invention is to provide a quantum entangled photon pair generating device capable of generating high-purity quantum entangled photon pairs by using common simple optical elements rather than specially designed ones.

Another object of the invention is to prevent excessive loss of light.

The invention provides a quantum entangled photon pair generating device including a polarization maintaining loop path. A loop input unit receives excitation light from an external source, separates the excitation light into first and second excitation light components with mutually orthogonal polarization planes, feeds the first excitation light component clockwise into the polarization maintaining loop path, and feeds the second excitation light component counterclockwise into the polarization maintaining loop path. A second-order nonlinear optical medium disposed in the polarization maintaining loop path generates up-converted light from each excitation light component by second harmonic generation, and generates down-converted light from the up-converted light by spontaneous parametric down-conversion. A polarization manipulation unit manipulates the polarization direction of at least one of the excitation light or down-converted light components. The down-converted light propagating in the clockwise and counterclockwise directions on the polarization maintaining loop path is received by a loop output unit that recombines the clockwise and counterclockwise propagating components and outputs the combined light. The combined down-converted light includes polarization entangled photon pairs having substantially the same wavelength as the excitation light.

The loop input unit and loop output unit may be combined into a single polarization splitting-combining module.

Since the input excitation light and the output down-converted light have substantially the same wavelength-band, the optical components of the quantum entangled photon pair generating device can be designed for operation at this wavelength. It is unnecessary to provide guaranteed coupling performance or loss performance at the shorter wavelength of the up-converted light, which is used only within the second-order nonlinear optical medium. Since the quantum entangled photon pair generating device can be fabricated from standard optical components optimized for operation at the excitation wavelength, it can be manufactured at a low cost, and can provide output of high purity with comparatively low loss.

BRIEF DESCRIPTION OF THE DRAWINGS

In the attached drawings:

FIGS. 4A and 4B are wavelength spectra showing results of confirmatory experiments for the first embodiment;

FIG. 9 and FIGS. 9A to 9D schematically illustrate polarization rotation and optical axis relationships in the nonreciprocal polarization converters in FIG. 8;

FIG. 12 and FIGS. 12A to 12D schematically illustrate polarization rotation and optical axis relationships in the polarization converter in FIG. 11;

DETAILED DESCRIPTION OF THE INVENTION

Figure 1:
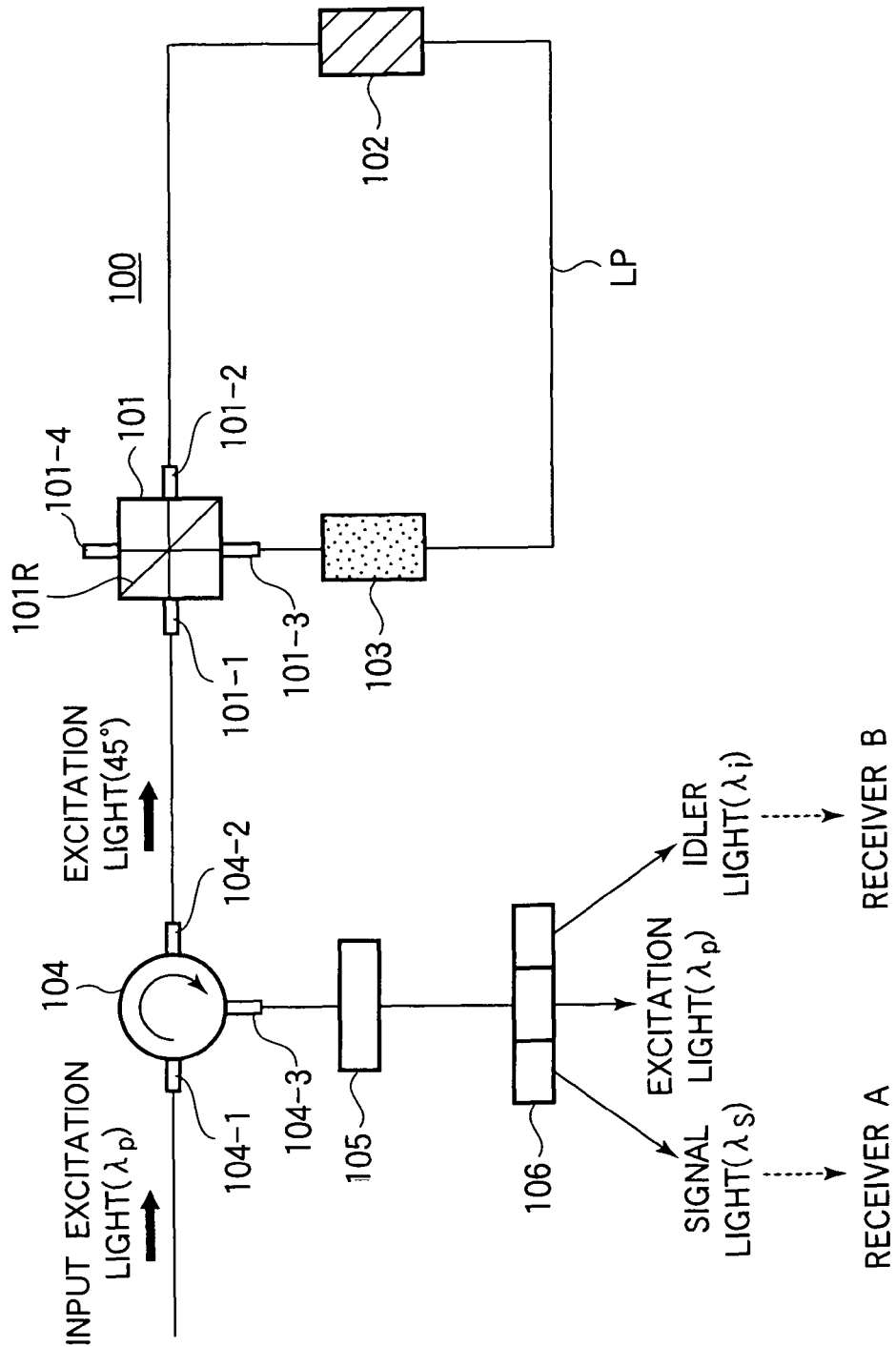
FIG. 1 schematically illustrates the structure of a polarization entangled photon pair generating device in a first embodiment of the invention.

Embodiments of the invention will now be described with reference to the attached drawings, in which like elements are indicated by like reference characters.

First Embodiment

Referring to FIG. 1, the quantum entangled photon pair generating device 100 in the first embodiment includes at least a polarization splitting-combining module 101, a second-order nonlinear optical medium 102, and a first half-wave plate 103. Two of the input and output ports of the polarization splitting-combining module 101, the second-order nonlinear optical medium 102, and the first half-wave plate 103 constitute a Sagnac interferometer loop, in which the first half-wave plate 103 functions as the polarization manipulation unit. The quantum entangled photon pair generating device 100 also includes an optical circulator 104, an optical low-pass filter 105, and a wavelength division multiplexing (WDM) filter 106 that function as optical input/output devices for input of excitation light to and output of entangled photon pairs from the optical loop LP.

The optical loop LP is preferably a polarization maintaining optical system. Accordingly, special consideration is given to the relationship among the optical axes of the polarization splitting-combining module 101, second-order nonlinear optical medium 102, and first half-wave plate 103.

The optical loop LP may be formed with polarization-maintaining optical fiber, or with free space optics employing only lenses and mirrors. In a fiber loop, if some of the optical components have attached pigtails of conventional optical fiber lacking the polarization maintaining property, a pseudo-polarization-maintaining optical system can still be constructed by using additional optical devices such as polarization controllers.

The vacuum wavelength of the input excitation light will be denoted $\lambda_p$. This wavelength $\lambda_p$ is near the desired wavelengths of the quantum entangled photon pairs, e.g., near 1550 nm for use in 1550-nm optical communication systems.

The second-order nonlinear optical medium 102 is a nonlinear optical medium such as PPLN that produces a second-order nonlinear optical effect. Upon reception of input excitation light with a wavelength of $\lambda_p$, the second-order nonlinear optical medium 102 generates light with a wavelength ($\lambda_p/2$) equal to half the input wavelength by second harmonic generation (SHG). The generated light, referred to as SHG light below, is used as seed light for an SPDC process that generates correlated photon pairs consisting of a signal photon with a vacuum wavelength $\lambda_s$ and an idler photon with a vacuum wavelength $\lambda_i$.

The law of conservation of energy demands that the wavelengths $\lambda_p, \lambda_s, \lambda_i$ of the input excitation light and photon pairs satisfy the following equation (1).

$$\frac{2}{\lambda_p} = \frac{1}{\lambda_s} + \frac{1}{\lambda_i} \quad (1)$$

The polarization splitting-combining module 101 has a first input/output port 101-1 coupled to the optical circulator 104, a second input/output port 101-2 disposed opposite the first input/output port 101-1 and coupled to the second-order nonlinear optical medium 102, a third input/output port 101-3 coupled to the first half-wave plate 103, and a fourth input/output port 101-4 disposed opposite the third input/output port 101-3.

No essential light is input to or output from the fourth input/output port 101-4 in the first embodiment, so there is no need to connect optical signal input/output interface devices, such as an optical fiber pigtail or an optical connector. The fourth input/output port 101-4 is shown only for convenience of description. This is also true in the third and fifth embodiments. The fourth input/output port 101-4 is used in the second and fourth embodiments.

In FIG. 1, the polarization splitting-combining module 101 both splits and combines the light output to and input from the optical loop LP. In a variation of the first embodiment, the splitting and combining functions are carried out by separate optical devices.

The optical circulator 104 has a first input/output port 104-1 for receiving input excitation light with wavelength $\lambda_p$, a second input/output port 104-2 for outputting the light received from the first input/output port 104-1 to the first input/output port 101-1 of the polarization splitting-combining module 101, and a third input/output port 104-3 for outputting light received from the first input/output port 101-1 of the polarization splitting-combining module 101 to the optical low-pass filter 105 via the second input/output port 104-2.

The polarization splitting-combining module 101 and the optical circulator 104 must provide assured operation at wavelengths near $\lambda_p$, including $\lambda_s$, and $\lambda_i$, but need not operate correctly at $\lambda_p/2$ or wavelengths near $\lambda_p/2$. If the excitation wavelength $\lambda_p$ is 1550 nm, for example; a commercially available 1550-nm polarization splitting and combining module and a commercially available 1550-nm optical circulator may be used. Devices guaranteed to operate at wavelengths of both $\lambda_p$ and $\lambda_p/2$, as required by Inoue and by Lim et al., are unnecessary.

The components of light entering the polarization splitting-combining module 101 are defined in terms of the direction of oscillation of the electric field vector of the light with respect to the plane of incidence of the light on the polarization selective reflecting surface of the polarization splitting-combining module. The incident light is said to be p-polarized if its electric field vector oscillates parallel to this incidence plane, and s-polarized if its electric field vector oscillates perpendicular to this incidence plane. Incident light may include both p-polarized and s-polarized components.

In the polarization splitting-combining module 101, the p-polarized component of light input to the first input/output port 101-1 is output from the second input/output port 101-2, and the s-polarized component is output from the third input/output port 101-3. The p-polarized component of light input to the second input/output port 101-2 is output from the first input/output port 101-1, and the s-polarized component of light input to the third input/output port 101-3 is output from the first input/output port 101-1.

The polarization splitting-combining module 101 may be a commercially available thin-film polarizing beam splitter, but the invention is not limited to this type of device. For example, a birefringent polarizing prism may be used instead.

The input excitation light with a wavelength of $\lambda_p$ is input to the first input/output port 104-1 of the optical circulator 104, output from the second input/output port 104-2, input to the first input/output port 101-1 of the polarization splitting-combining module 101, and split into a p-polarized component which is output from the second input/output port 101-2 of the polarization splitting-combining module 101 and an s-polarized component which is output from the third input/output port 101-3.

In the first embodiment, the optical intensities of the p-polarized component and the s-polarized component as split in this way must be identical. Accordingly, the excitation light input to the first input/output port 101-1 of the polarization splitting-combining module 101 must be polarized so that the intensity ratio of its p-polarized and s-polarized components is 1:1. Such input excitation light will be referred to as 45° polarized excitation light. This excitation light may be prepared by inserting a polarization controller at a position preceding the first input/output port 104-1 of the optical circulator 104 to assure that the excitation light input to the first input/output port 101-1 of the polarization splitting-combining module 101 includes only light that is linearly polarized at a 45° angle with respect to the p- and s-polarization directions in the polarization splitting-combining module 101.

The first half-wave plate 103 has mutually orthogonal fast and slow axes that produce an optical phase difference of π radians between the components of light of wavelength $\lambda_p$ polarized parallel to the two axes. In the description below, unless otherwise noted, the term '1/n-wave plate' (n=2, 3, 4, . . . ) will mean a plate producing a phase difference of 1/n of the wavelength $\lambda_p$ of the excitation light.

Figure 2:
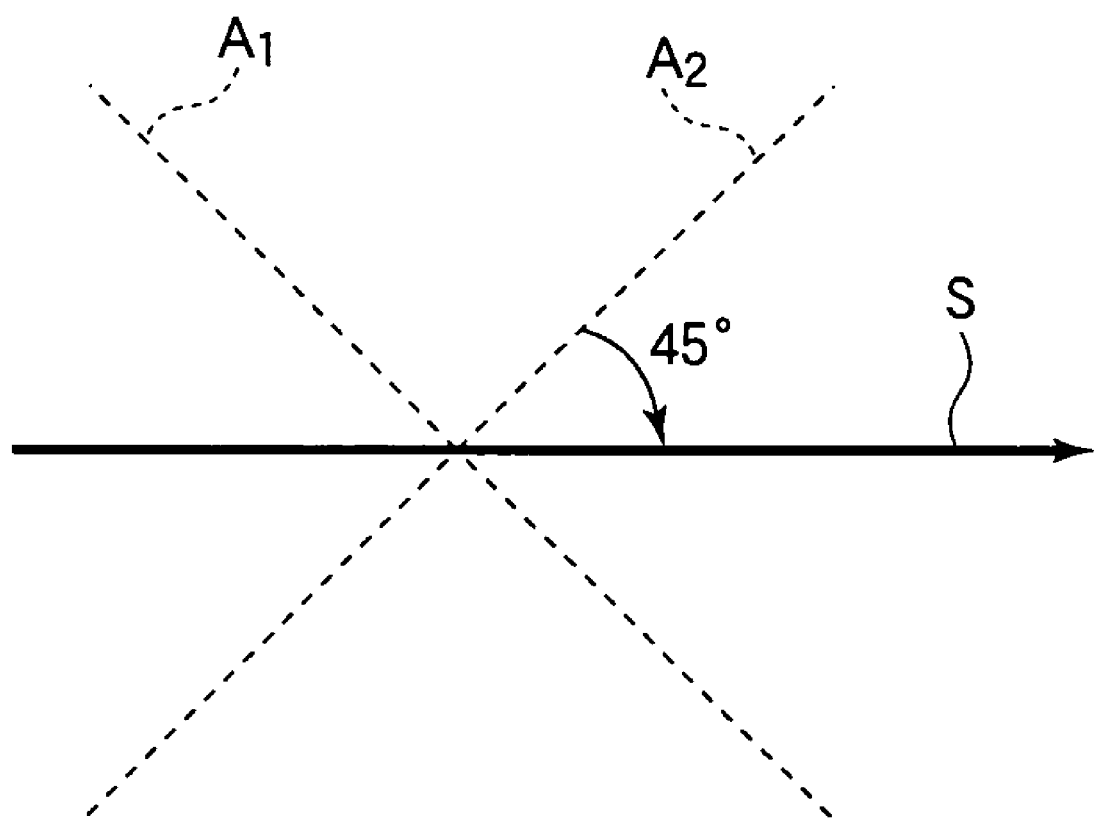
FIG. 2 illustrates the relationship between the polarization direction of excitation light output from the third input/output port of the polarization splitting-combining module in FIG. 1 and the optical axes of the first half-wave plate in FIG. 1.

The first half-wave plate 103 is aligned as shown in FIG. 2 so that its fast and slow axes $A_1, A_2$ are at 45° angles to the polarization direction S of the s-polarized component of the excitation light output from the third input/output port 101-3 of the polarization splitting-combining module 101. The polarization direction of the excitation light output from the third input/output port 101-3 is rotated by 90° by passage through this half-wave plate 103 to match the direction of the p-polarized component.

Instead of a first half-wave plate 103, it is possible to connect polarization maintaining optical fibers to the optical input/output ports of the polarization splitting-combining module 101 and the second-order nonlinear optical medium 102, and splice the polarization maintaining optical fibers end-to-end by fusion with a relative rotation of 90° so that the fast axis of each fiber is aligned with the slow axis of the other fiber, this splice taking the place of the first half-wave plate 103. A quantum entangled photon pair generating device using this structure produces the same effects as one using a first half-wave plate 103.

In the first embodiment (and also in the second to the fourth embodiments below), the excitation light input to the second-order nonlinear optical medium 102, the SHG light, and the signal and idler photons output from the second-order nonlinear optical medium 102 are all linearly polarized in the same direction. When a PPLN waveguide is used as the second-order nonlinear optical medium 102, for example, this alignment can be obtained by input of excitation light polarized in the Z-axis direction of the PPLN crystal and use of PPLN's $d_{33}$ second-order nonlinear optical coefficient for the SHG and SPDC processes.

The optical low-pass filter 105 removes the $\lambda_p/2$ wavelength component of the light output from the third input/output port 104-3 of the optical circulator 104, thereby removing the SHG light generated in the second-order nonlinear optical medium 102. The optical low-pass filter 105 is transparent to the excitation light component with wavelength $\lambda_p$, the signal photon component with wavelength $\lambda_s$, and the idler photon component with wavelength $\lambda_i$.

Of the light that passes through the optical low-pass filter 105, the WDM filter 106 separates at least the signal photon component with wavelength $\lambda_s$ and the idler photon component with wavelength $\lambda_i$ and transmits them on separate optical paths. A conventional wavelength division multiplex (WDM) filter of the arrayed waveguide grating (AWG) type, transmitting at least the $\lambda_s$ and $\lambda_i$ wavelength components representing the signal and idler photons, may be used as the WDM filter 106.

The signal photon and idler photon wavelength components transmitted through the WDM filter 106 are carried over the optical transmitting paths of, for example, an optical fiber communication network to respective receiving parties A and B. The receiving parties A and B then perform simultaneous measurement and other operations to communicate information by a known quantum information communication protocol.

The operation of the quantum entangled photon pair generating device 100 in the first embodiment will be described on the assumption that a PPLN crystal is used as the second-order nonlinear optical medium 102, and that the component corresponding to its $d_{33}$ second-order nonlinear optical coefficient is used for the SHG and SPDC processes.

The excitation light with wavelength $\lambda_p$ is output from the second input/output port 101-2 and the third input/output port 101-3 as a p-polarized component and an s-polarized component of identical intensities. The PPLN crystal is disposed in the second-order nonlinear optical medium 102 so that the polarization direction of the p-polarized component corresponds to the Z-axis of the PPLN crystal.

First, the process that takes place as the excitation light propagates on the optical loop LP in the clockwise direction (the excitation light component output from the second input/output port 101-2 as the p-polarized light) will be described.

Input of the excitation light causes the PPLN crystal to generate SHG light as seed light. Quantum correlated photon pairs consisting of a signal photon and an idler photon are then generated from the SHG light in the same PPLN crystal by the SPDC process.

The excitation light, SHG light, and signal and idler photons are all output from the PPLN crystal with the same polarization direction and pass through the first half-wave plate 103. There the excitation light, signal light, and idler light, which have wavelengths near $\lambda_p$, have their planes of polarization rotated by 90°, so they enter the third input/output port 101-3 of the polarization splitting-combining module 101 as s-polarized components and are output from the first input/output port 101-1.

The SHG light, which has a wavelength $\lambda_p/2$, receives a phase shift of one wavelength from the first half-wave plate 103, so its polarization is not rotated. Accordingly, the SHG light is input to the third input/output port 101-3 of the polarization splitting-combining module 101 as a p-polarized component, and is not output from the first input/output port 101-1. If the wavelength dependency of the polarization splitting-combining module 101 is ignored, the SHG light is output from the fourth input/output port 101-4, which is not used in the first embodiment.

Accordingly, as the excitation light propagates in the clockwise direction around the optical loop LP, the SHG and SPDC processes both take place, and quantum correlated photon pairs consisting of s-polarized signal photons and s-polarized idler photons are output from the first input/output port 101-1.

Next, the processes that take place as the excitation light output from the third input/output port 101-3 as s-polarized light propagates in the counterclockwise direction around the optical loop LP will be described.

This excitation light first passes through the first half-wave plate 103, in which it undergoes a polarization rotation of 90°, and is output as a p-polarized component.

When the p-polarized component is input to the PPLN crystal used as the second-order nonlinear optical medium 102, the polarization direction of the excitation light matches the Z-axis direction of the PPLN crystal. Like the excitation light propagating clockwise on the optical loop LP, the excitation light propagating counterclockwise triggers SHG and then SPDC processes in the PPLN crystal, producing SPDC quantum correlated photon pairs consisting of signal and idler photons.

If the optical loss in the first half-wave plate 103 is ignored, then the optical intensity of the counterclockwise excitation light entering the PPLN crystal is identical to the optical intensity of the clockwise excitation light entering the PPLN crystal.

Since the excitation light propagating in the clockwise and counterclockwise directions both have the same polarization direction and optical intensity, if the PPLN crystal has a centrally symmetric structure, the probabilities of generation of SHG light and SPDC quantum correlated photon pairs from the excitation light propagating in both directions in the PPLN crystal are also identical.

The excitation light, SHG light, and signal and idler photons that exit the PPLN crystal propagating in the counterclockwise direction are input to the second input/output port 101-2 of the polarization splitting-combining module 101 as p-polarized light, and are therefore output from the first input/output port 101-1 as p-polarized light.

In short, the counterclockwise propagation of excitation light on the optical loop LP produces p-polarized signal and idler photons that are output from the first input/output port 101-1 of the polarization splitting-combining module 101.

As in the technique described by Lim et al., photons travel clockwise and counterclockwise around the optical loop LP with equal probability, and when the intensity of the excitation light is sufficiently weak, the polarization state of each signal-idler photon pair output from the first input/output port 101-1 is a superposition of an s-polarized state produced by clockwise travel and a p-polarized state produced by counterclockwise travel. Although each photon may show either one of the two states when its polarization is measured, the signal and idler photons both show the same state if their polarization is measured simultaneously in the same way. The quantum entangled photon pair generating device 100 therefore generates polarization entangled photon pairs.

Figure 3A:
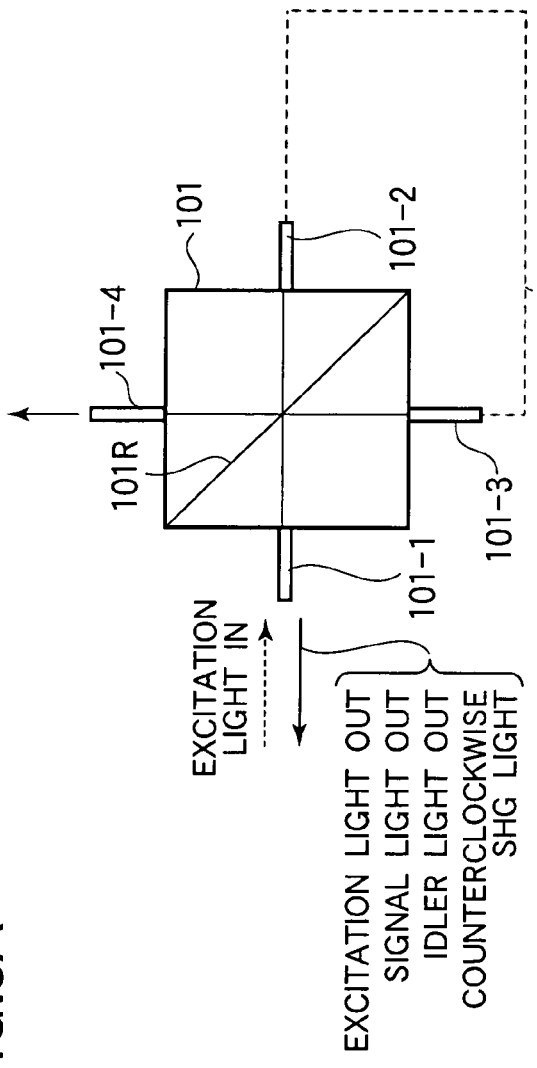
FIG. 3A schematically indicates the input and output ports for excitation light, SHG light, and signal and idler photons from a polarizing beam splitter used as the polarization splitting-combining module in FIG. 1.
Figure 3B:
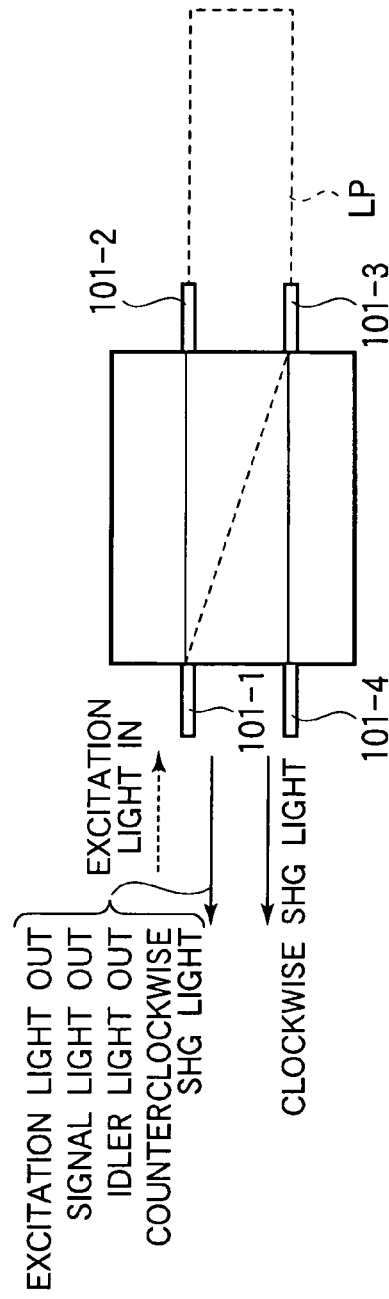
FIG. 3B schematically indicates the input and output ports for excitation light, SHG light, and signal and idler photons from a birefringent prism used as the polarization splitting-combining module in FIG. 1.

The components of the light output from the first input/output port 101-1 of the polarization splitting-combining module 101 are shown in FIGS. 3A and 3B. In FIG. 3A, the polarization splitting-combining module 101 is a polarizing beam splitter using a thin film 101R. In FIG. 3B, the polarization splitting-combining module 101 is a conventional polarizing prism using a birefringent crystal.

In both cases, the first input/output port 101-1 outputs the desired polarization entangled signal-idler photon pairs, as well as the excitation light components propagating in the clockwise and counterclockwise directions in the optical loop LP and the SHG light component generated by the excitation light propagating counterclockwise in the optical loop LP.

The light output from the first input/output port 101-1 is input to the second input/output port 104-2 and output from the third input/output port 104-3 of the optical circulator 104. For convenience, the wavelength dependency of the optical circulator 104 is ignored and it is assumed that the output from the third input/output port 104-3 includes the SHG component of wavelength $\lambda_p/2$.

The light output from the third input/output port 104-3 passes through the optical low-pass filter 105, where the SHG component is removed.

The remaining light is input to the WDM filter 106, from which the signal photon component with wavelength $\lambda_s$ and the idler photon component with wavelength $\lambda_i$ are output onto separate optical paths. The WDM filter 106 needs to provide sufficient wavelength separation to prevent the $\lambda_p$ wavelength component, that is, the returning excitation light, from entering these separate optical paths. An AWG-type WDM filter that transmits at least the signal photon wavelength $\lambda_s$ and the idler photon wavelength $\lambda_i$ may be used. As another exemplary structure, the WDM filter may be combined with a fiber Bragg grating having a Bragg wavelength of $\lambda_p$ to provide sufficient blocking of the excitation light component.

The signal photon wavelength component and idler photon wavelength component that have passed through the WDM filter 106 are carried on separate optical transmission paths to receiving parties A and B, who then communicate by means of the known quantum communication protocol mentioned above.

As described above, in the first embodiment, the SHG light of wavelength $\lambda_p/2$, which serves as seed light in the SPDC process, is needed only within the second-order nonlinear optical medium 102, so its transmission losses in optical devices other than the second-order nonlinear optical medium 102 can be ignored, and when the SHG light leaves the optical loop LP, it can simply be discarded. In particular, the polarization splitting-combining module 101 and the optical circulator 104 can be designed for operation at wavelengths near $\lambda_p$, without having to operate in any particular way at the $\lambda_p/2$ wavelength. The optical couplings that couple light into and out of the second-order nonlinear optical medium 102 also have to perform well only at or near the $\lambda_p$ wavelength, and not at both wavelengths $\lambda_p/2$ and $\lambda_p$. This can reduce the system cost, as well as reducing optical loss, and produce a higher-purity quantum entangled state.

Since the SHG light of wavelength $\lambda_p/2$ is not needed outside the second-order nonlinear optical medium 102, even a potentially great optical loss of this light in the polarization splitting-combining module 101 and its optical couplings causes no problem. A high optical loss is in fact preferable because it helps reduce the requirements placed on the optical low-pass filter 105 that removes the SHG component from the final output.

As the second-order nonlinear optical medium 102, a lithium niobate (LiNbO$_3$) crystal, a PPLN crystal, another type of bulk crystal, a PPLN waveguide formed in such a bulk crystal, or other various second-order nonlinear optical media may be used, depending on the desired wavelengths of the quantum entangled photon pairs. For example, the LiNbO$_3$ crystal described by Lim et al. may be used to produce quantum entangled photon pairs in the 1.5-micrometer waveband.

In order to realize the quantum entangled photon pair generating device 100 in the first embodiment, it is of particular significance for industrial use for the SHG and SPDC processes to take place within the second-order nonlinear optical medium 102 with high efficiency. For this reason, phase matching between the input excitation light and the SHG light and phase matching between the SHG light and the signal and idler photons are both important.

For a bulk crystal, angle phase matching is commonly used, but as pointed out by Takeuchi, the resulting spatial separation of the signal and idler photons can lower the purity of the quantum entangled state.

Use of a ferroelectric periodic-polarization inverting structure or other structure in which the second-order nonlinear optical coefficient is spatially modulated has the advantage of producing a quasi-phase matching condition without relying on angle phase matching.

A second-order nonlinear optical medium combined with an optical waveguide structure has the advantage of mitigating the loss of purity of the quantum entanglement state due to spatial separation, and also the advantage of strong light confinement, which increases the second-order nonlinear optical coefficients, thereby increasing the probabilities with which the SHG and SPDC processes take place. A PPLN waveguide is therefore thought to be an optimal second-order nonlinear optical medium 102 in a quantum entangled photon pair generating device 100 for the 1.5-micrometer waveband.

The energy conservation and momentum conservation (phase matching) laws for the SHG and SPDC processes in a PPLN waveguide can be expressed by the following equations (2) to (5). The relationship between wavenumber and wavelength in a PPLN waveguide with an effective refractive index n is given by equation (6).

SHG Process:

$$\text{energy conservation law } \frac{1}{\lambda_{SHG}} = \frac{2}{\lambda_p} \quad (2)$$

$$\text{momentum conservation law } 2k_p - k_{SHG} = \frac{2\pi}{\Lambda} \quad (3)$$

SPDC Process:

$$\text{energy conservation law } \frac{1}{\lambda_{SHG}} = \frac{2}{\lambda_p} = \frac{1}{\lambda_s} + \frac{1}{\lambda_i} \quad (4)$$

$$\text{momentum conservation law } k_s + k_i - k_{SHG} = \frac{2\pi}{\Lambda} \quad (5)$$

$$k_x = \frac{2\pi n_x}{\lambda_x} \quad (x = p, SHG, s, i) \quad (6)$$

In these equations, λ indicates vacuum wavelength, k indicates wavenumber in the PPLN waveguide, Λ indicates the PPLN polarization reversal period, and the subscripts p, SHG, s, and i represent the input excitation light, SHG light, signal photons, and idler photons, respectively.

Equations (2) and (4) represent wavelength and frequency relationships based on the law of conservation of energy. The wavelength of the SHG light is half the wavelength of the input excitation light. The sum of the optical frequencies of the signal and idler photons is equal to the frequency of the SHG seed light from which they are generated and is therefore twice the frequency of the input excitation light, where light of a wavelength λ has a frequency of c/λ, c being the speed of light in a vacuum.

Equations (3) and (5) relate to phase matching. If the effective refractive indices $n_p$, $n_{SHG}$ are determined from the excitation light wavelength $\lambda_p$ and the shape of the PPLN waveguide, the polarization reversal period Λ is determined from equations (3) and (6).

If the signal and idler photon wavelengths differ from each other ($\lambda_s \neq \lambda_p$, $\lambda_i \neq \lambda_p$), in general, equations (3) and (5) do not both hold. That is, the phase matching conditions for the SHG and SPDC processes are incompatible.

From the well-known solution of the coupled-mode equation describing the nonlinear optical effect, however, phase unmatch is expected to decrease the probability of occurrence of the SHG and SPDC processes in proportion to { sin²(δL/2)}/(δL/2)², where δ is defined by equation (7) and indicates the phase unmatch in the SPDC process, and L indicates the PPLN waveguide length.

$$\delta = k_s + k_i - k_{SHG} - \frac{2\pi}{\Lambda} \quad (7)$$

If the phase unmatch tolerance limit is assumed to be a 50% decrease in the probability of occurrence of the SHG and SPDC processes from the maximum value obtained under phase matching conditions, the value of δ is approximately 2.78, as derived from the following equation:

$$\frac{\sin^2(\delta L/2)}{(\delta L/2)^2} = 0.5$$

This limits the wavelength band of the correlated photon pairs generated in the SPDC process, and determines the wavelength range of the correlated signal and idler photons.

In the vicinity of the excitation light wavelength in which the wavelength dependency of the effective refractive index is substantially linear and can be represented by equation (8), equation (9) is obtained from equations (4), (6), and (8), so the phase matching condition equations (3) and (5) can both be satisfied within this wavelength range.

$$n(\lambda) = A + B\lambda \quad (8)$$

$$2k_p = \frac{4\pi n_p}{\lambda_p} = 2\pi \frac{2}{\lambda_p}(A + B\lambda_p) = 2\pi\left[\left(\frac{1}{\lambda_s} + \frac{1}{\lambda_i}\right)A + 2B\right] \quad (9)$$

$$= 2\pi\left[\frac{A + B\lambda_s}{\lambda_s} + \frac{A + B\lambda_i}{\lambda_i}\right] = 2\pi\left[\frac{n_s}{\lambda_s} + \frac{n_i}{\lambda_i}\right] = k_s + k_i$$

From the above description, it will be understood that in order to realize the quantum entangled photon pair generating device 100 in the first embodiment, first the polarization reversal period Λ of the PPLN waveguide should be chosen to satisfy equation (3), that is, to satisfy the phase matching condition for the SHG process. Generation of correlated signal and idler photons with a wavelength combination ($\lambda_s$, $\lambda_i$) satisfying the SPDC phase matching condition represented by equation (5), or at least having a phase unmatch within an allowed tolerance range, can then can be expected, leading to output of the desired quantum entangled photon pairs.

A fundamental confirmatory experiment was carried out to demonstrate the operation of the first embodiment. In this experiment, it was confirmed that input of 1.55-micrometer band excitation light to a PPLN waveguide caused the SHG and SPDC processes to occur, generating correlated signal and idler photons in the 1.55-micrometer band.

The PPLN waveguide device used in this experiment was fabricated by creating a periodic polarization reversal structure in a $LiNbO_3$ substrate having a MgO-doped stoichiometric composition, and then machining a ridge optical waveguide structure by proton exchange and dicing.

The length of the device was 6 cm, and the ridge width was about 10 micrometers. The polarization reversal period Λ was about 19.3 micrometers. This value was determined so that the excitation wavelength $\lambda_p$ (referred to as the QPM wavelength) that satisfied the phase matching condition for SGH light in equation (3) was 1551 nm.

The propagation loss of the device in the 1550-nm band was approximately 0.1 dB/cm.

The experiment was carried out using a PPLN module fabricated by optically integrating this PPLN waveguide device with a temperature control element (Peltier cooler), a coupling lens, and optical input/output fibers. The insertion loss of the module in the 1550-nm band was approximately 3.8 dB.

Continuous wave light with a wavelength near 1550 nm was input to the PPLN module and variations in the optical spectrum before and after passage through the module was observed.

The graph in FIG. 4A shows the result of the experiment. The thin solid line indicates the input optical spectrum; the bold solid line indicates the output optical spectrum. The device temperature was controlled to a constant 29.2° C. The wavelength of the input excitation light was set at 1550.9 nm, corresponding to the QPM wavelength at this temperature. The input optical intensity was set at +21.3 dB.

As seen from the result in FIG. 4A, a continuous optical output spectrum extending on both sides from a peak at the excitation wavelength ($\lambda_p$) of 1550.9 nm was observed, confirming the generation of signal and idler photons by the SPDC process. This spectrum was substantially symmetrical around the excitation wavelength, indicating that the signal and idler photons were equally confined in the PPLN waveguide and were both output from the PPLN waveguide into the output optical fiber.

The graph in FIG. 4B shows the output optical spectrum from the module when the temperature of the PPLN waveguide device was controlled to a constant 35.0° C. without altering the wavelength of the excitation light input to the module. Under these experimental conditions, the wavelength of the input excitation light was shorter than the QPM wavelength by about 0.8 nm, departing so greatly from the SHG phase matching state represented by equation (3) that substantially no SHG light could be generated. The shape of the optical spectrum of the output light was substantially the same as the shape of the optical spectrum of the input light, indicating that the SPDC process did not occur. The result in FIG. 4B indicates that the SPDC process does not occur without the SHG process.

In contrast, the result in FIG. 4A indicates that if the wavelength of the input excitation light matches the QPM wavelength and the SHG process occurs within the PPLN waveguide device, the SPDC process also occurs, using the SHG light as seed light. In other words, this experiment showed that SHG light was generated in the second-order nonlinear optical medium and that the SPDC process, which can generate quantum correlated signal-idler photon pairs, also took place, using the SHG light as seed light.

The output spectrum indicated in FIG. 4A was comparatively wide. The single-sided 3-dB bandwidth of the SPDC correlated photon pairs was estimated to be about 32 nm (4 THz) and the single-sided 10-dB bandwidth was estimated to be about 54 nm (7 THz).

The number of photons generated in the SPDC process was estimated by integrating the optical spectrum. The estimated numbers of photons generated were $1.540 \times 10^{11}$ (/s) for the shorter wavelength or signal photon component (1491 nm to 1549 nm), and $1.454 \times 10^{11}$ (/s) for the longer wavelength or idler photon component (1552.8 nm to 1615.8 nm). These values were in good mutual agreement. The reason is thought to be that the waveguide structure helped confine all of the signal and idler photons in the PPLN waveguide and output them from the light emitting end of the optical fiber.

Figure 5B:
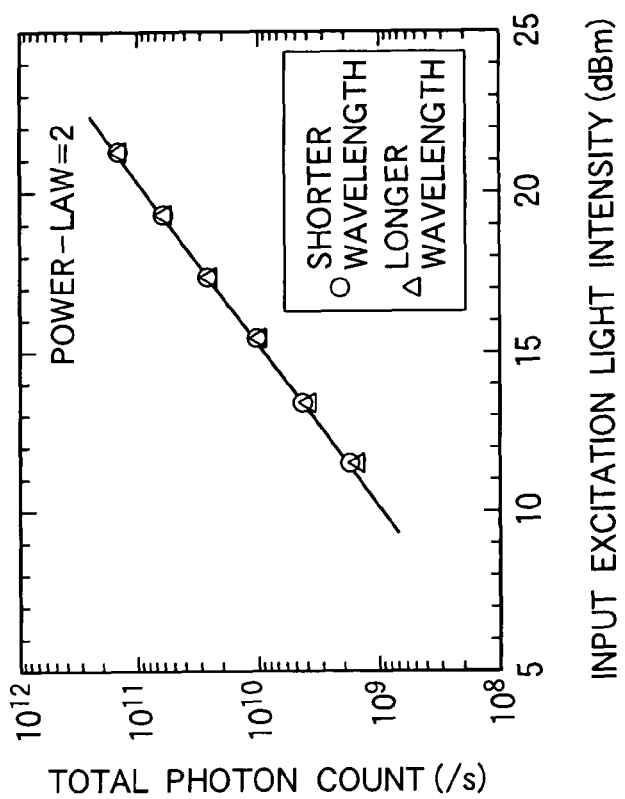
FIGS. 5A and 5B are intensity plots showing further results of the confirmatory experiments.
Figure 5A:
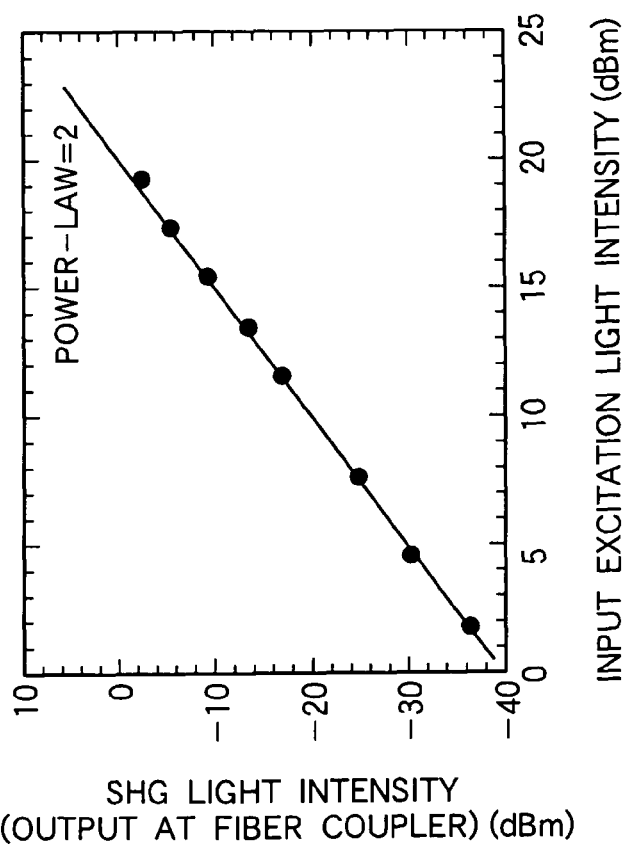

FIGS. 5A and 5B show cascaded spontaneous parametric down conversion characteristics obtained experimentally from the PPLN module, measured under the same PPLN waveguide temperature and excitation light wavelength conditions as in FIG. 4A. FIG. 5A shows the dependency of the 775.45-nm SHG light intensity on the input excitation light intensity; FIG. 5B shows the dependency of the total number of signal photons (the shorter wavelength component) and idler photons (the longer wavelength component) on the input excitation light intensity.

Both results show a square-law dependency on the intensity of the input excitation light. The SHG process generates SHG light with an intensity proportional to the square of the intensity of its fundamental light, in this case the excitation light. The SPDC process occurs with a probability proportional to the intensity of its seed light, and can therefore be expected to occur with a probability proportional to the square of the intensity of the excitation light in the present embodiment, at least in the range in which the excitation light is not attenuated. By confirming this expectation, the results in FIGS. 5A and 5B indicated that the SHG and SPDC processes actually occurred and that the observed signal and idler photons were generated by these processes.

The coupling lenses, input/output optical fibers, and other optical elements used in the PPLN module in these experiments were all designed for long wavelength use (in the 1.5-micrometer band), with no consideration given to short wavelength use (in the 0.78-micrometer band). Therefore, the results of these experiments also demonstrated that the entire waveguide device can be configured with only long-wavelength optical elements. More specifically, the results of the fundamental confirmatory experiments shown in FIGS. 4A and 4B and FIGS. 5A and 5B showed that the type of PPLN waveguide device used in these experiments can be used to fabricate device for generating quantum entangled photon pairs in the 1.5-micrometer wavelength band.

The following effects can be expected from the first embodiment. Unlike the prior art, this invention allows the second-order nonlinear optical medium 102 in the optical loop to carry out the SPDC process and to generate the seed light of needed for the SPDC process, so that light of the seed wavelength does not have to be supplied from outside the optical loop. Since the SHG light is needed only in the second-order nonlinear optical medium 102, the other system components need not couple or propagate the SHG light with low loss. Therefore, the quantum entangled photon pair generating device and other system components such as coupling lenses do not have to be designed for operation at wavelengths of both $\lambda_p$ and $\lambda_p/2$; they can be optimized for operation at and near $\lambda_p$. The result is that the system fabrication cost is reduced, less optical loss occurs at the wavelengths of the excitation light and the output photon pairs, and a quantum entangled optical pair generating device is obtained that can produce a quantum entangled state of improved purity.

Two variations of the first embodiment will be described with reference to FIGS. 6 and 7. In these variations, the method of input and output of the excitation light and quantum entangled photon pairs is altered.

Figure 6:
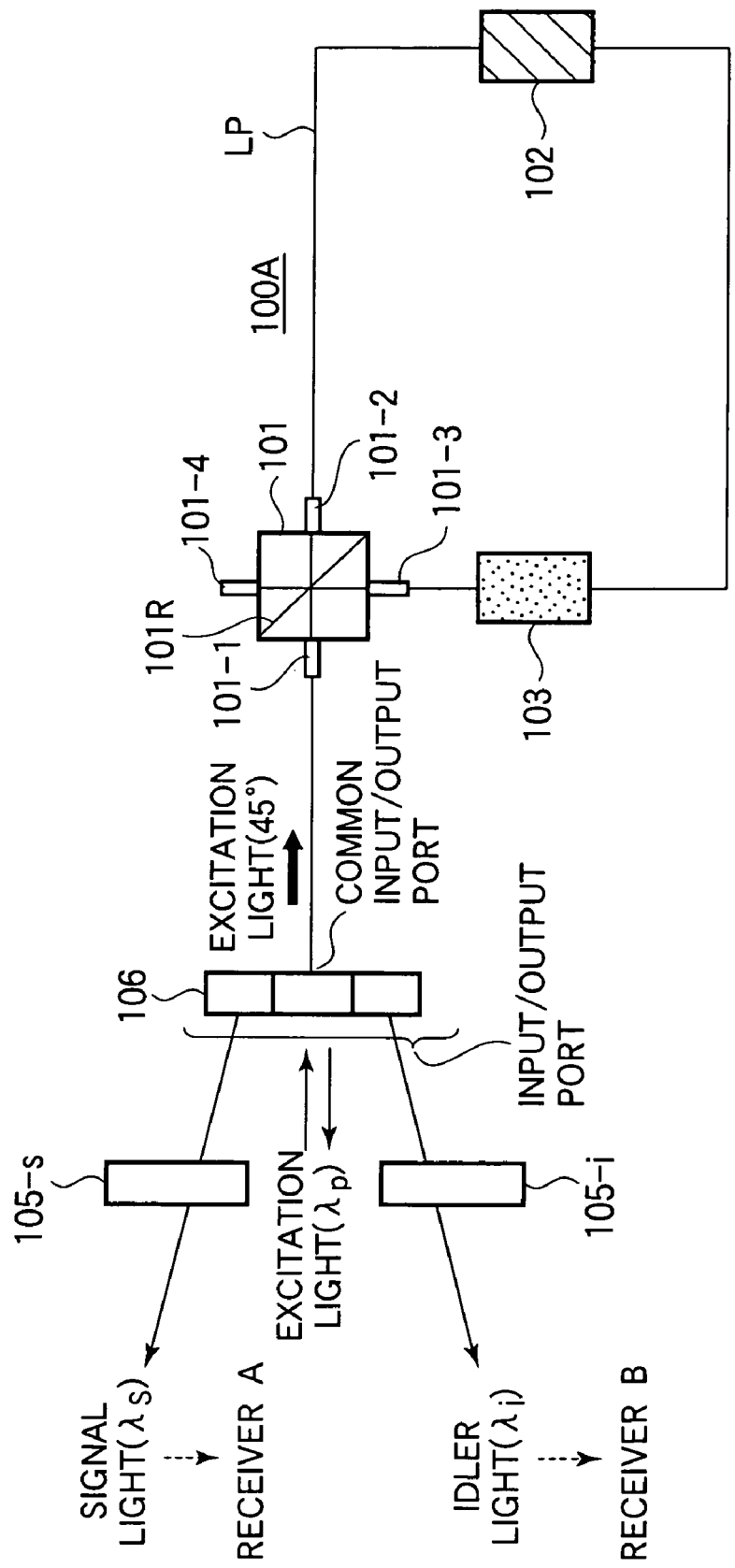
FIGS. 6 and 7 schematically illustrate variations of the structure in FIG. 1.

The variation shown in FIG. 6 dispenses with the optical circulator. The quantum entangled photon pair generating device 100A in FIG. 6 uses an arrayed waveguide grating (AWG) as the WDM filter 106. The AWG 106 has at least three transmission wavelengths: the signal photon wavelength $\lambda_s$, the idler photon wavelength $\lambda_i$, and the excitation wavelength $\lambda_p$.

The AWG 106 has wavelength selective input/output ports that transmit light of different wavelengths and a common input/output port that transmits light of all the input/output wavelengths. Light input to the common port is separated into individual wavelength components and output from the corresponding wavelength selective ports.

Excitation light from an external source is input to a wavelength selective port that transmits at the excitation wavelength, is then output from the common port to the first input/output port 101-1 of the polarization splitting-combining module 101, and is input bidirectionally (clockwise and counterclockwise) to the second-order nonlinear optical medium 102 as in the first embodiment.

The light propagating bidirectionally on the optical loop LP and returning to the polarization splitting-combining module 101 is output from its first input/output port 101-1 to the common port of the AWG 106 and separated into a signal photon component, an idler photon component, and an excitation light component. The signal and idler photon components are output through the wavelength selective ports for the corresponding wavelengths, with the excitation light removed. If necessary, optical low-pass filters 105-s and 105-i may be inserted downstream of the signal and idler output ports, as shown, to remove the SHG wavelength component.

Figure 7:
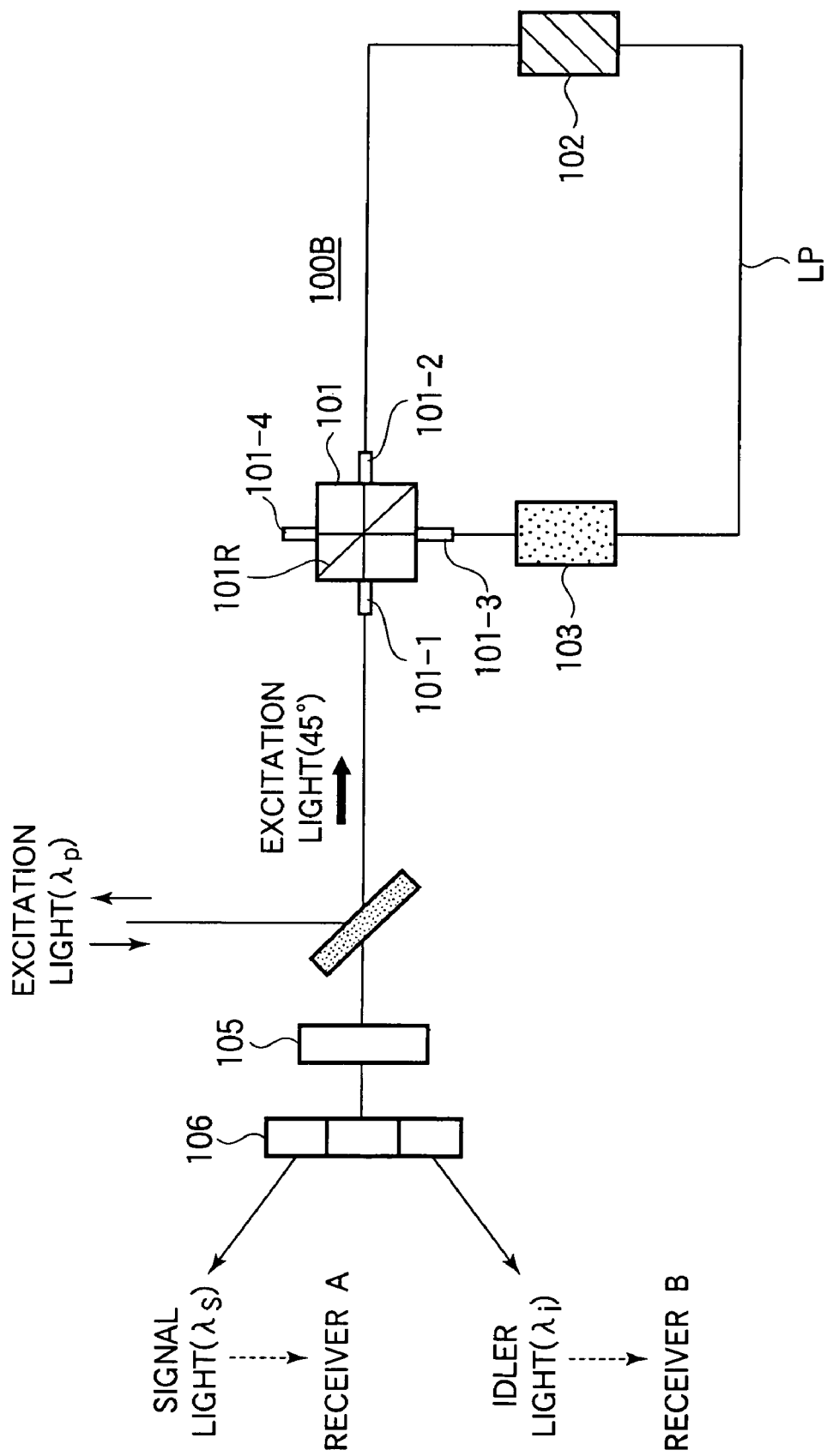

FIG. 7 shows another variation of the first embodiment in which an optical circulator is not used.

The quantum entangled photon pair generating device 100B in FIG. 7 uses a narrow band optical bandpass filter 108 that selectively reflects light with a wavelength of $\lambda_p$ and transmits light of other wavelengths, including the signal and idler wavelengths. Alternatively, an optical bandpass filter 108 that transmits light with a wavelength of $\lambda_p$ and reflects light of other wavelengths may be used. The signal and idler wavelengths must be sufficiently separated from the excitation wavelength $\lambda_p$ so as not to overlap the reflection or transmission band of the optical bandpass filter 108.

The optical bandpass filter 108 in FIG. 7 reflects excitation light of wavelength $\lambda_p$ into the first input/output port 101-1 of the polarization splitting-combining module 101. Among the light components that traverse the optical loop LP, return to the polarization splitting-combining module 101, and are output from the first input/output port 101-1, the excitation light component is again reflected by the optical bandpass filter 108 and the other components are transmitted through the optical bandpass filter 108 to an optical low-pass filter 105, which removes the SHG component. The signal photon component and idler photon component are then separated by an WDM filter 106 and output on separate optical paths.

In both of these variations, excitation light is returned toward its external source. Therefore, it is desirable that an optical isolator or some other type of optical element for dealing with the returning excitation light be provided in order to secure stable operation of the device.

Second Embodiment

The second embodiment uses a more complex polarization manipulation unit in the optical loop in order to eliminate the optical circulator used in the first embodiment.

Figure 8:
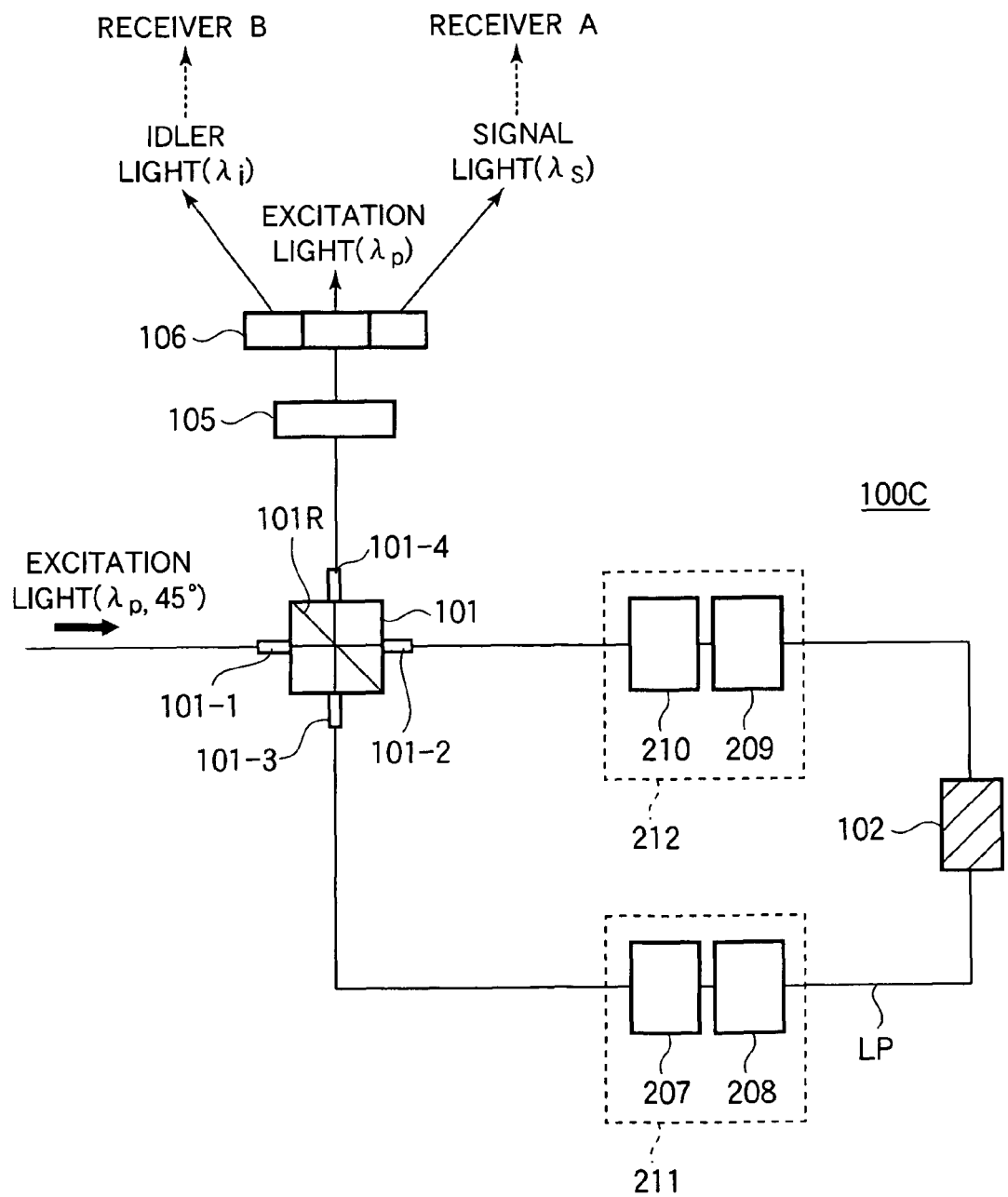
FIG. 8 schematically illustrates the structure of a polarization entangled photon pair generating device in a second embodiment of the invention.

Referring to FIG. 8, the quantum entangled photon pair generating device 100C in the second embodiment replaces the first half-wave plate used in the first embodiment with two pairs of nonreciprocal polarization converters 211, 212, each consisting of a Faraday rotator and a half-wave plate. This structure guarantees that the fundamental operations described in the first embodiment can be carried out, and enables the desired quantum entangled photon pairs to be output from a different port of the polarization splitting-combining module 101 than the port at which the excitation light is input.

The first nonreciprocal polarization converter 211 includes a first Faraday rotator 207 and a second half-wave plate 208 inserted in cascade on the optical loop LP between the third input/output port 101-3 of the polarization splitting-combining module 101 and the second-order nonlinear optical medium 102. The second nonreciprocal polarization converter 212 includes a second Faraday rotator 209 and a third half-wave plate 210 inserted in cascade between the second input/output port 101-2 of the polarization splitting-combining module 101 and the second-order nonlinear optical medium 102.

The Faraday rotators 207, 209 each rotate the plane of polarization incident light by exactly 45° at the excitation wavelength of $\lambda_p$ and by approximately 90° at the SHG wavelength of $\lambda_p/2$. The half-wave plates 208, 210, like the half-wave plate in the first embodiment, have fast and slow axes that produce an optical phase difference of $\pi$ radians at the $\lambda_p$ wavelength of the excitation light.

The components in the nonreciprocal polarization converters 211, 212 are aligned as shown in FIG. 9. The first nonreciprocal polarization converter 211 and second nonreciprocal polarization converter 212 have the same structure, so FIG. 9 applies to both.

Excitation light linearly polarized in a specific direction may be input from the side of the first Faraday rotator 207 or from the side of the second half-wave plate 208. The specific polarization direction matches either the p-polarization direction or the s-polarization direction in the polarization splitting-combining module 101. The optical axes of the second half-wave plate 208 are oriented at 22.5° angles to the p- and s-polarization directions.

The polarization splitting-combining module 101, second-order nonlinear optical medium 102, optical low-pass filter 105, and WDM filter 106 function as in the first embodiment, so descriptions will be omitted.

Next, the operation of the quantum entangled photon pair generating device 100C with the above structure will be described.

As in the first embodiment, when 45° excitation light of wavelength $\lambda_p$ is input to the first input/output port 101-1 of the polarization splitting-combining module 101, it is separated into a p-polarized component output from the second input/output port 101-2 and an s-polarized component output from the third input/output port 101-3, each component having the same optical intensity.

First, the processes that take place as the s-polarized component of the excitation light output from the third input/output port 101-3 of the polarization splitting-combining module 101 and propagates in the counterclockwise direction on the optical loop LP will be described.

This component of the excitation light initially encounters the first nonreciprocal polarization converter 211. The variations in its polarization state in this polarization converter 211 will be described with reference to FIG. 9 and FIGS. 9A to 9D.

The s-polarized component output from the third input/output port 101-3 is indicated by a rightward-pointing arrow in FIG. 9A. In passing through the first Faraday rotator 207, the polarization of this component is rotated by 45° counterclockwise, as indicated by a 45° upper-right pointing arrow in the center in FIG. 9A. The light then passes through the second half-wave plate 208, the optical axes of which are oriented at angles of 22.5° to the and s-polarization directions. The axis near the p-polarization direction is also at an angle of 22.5° to the plane of polarization of the light that has passed through the Faraday rotator 207, so the polarization of this light is rotated by a further 45° and the light output from the second half-wave plate 208 is p-polarized, as indicated by the upward-pointing arrow at the far right in FIG. 9A.

In short, first nonreciprocal polarization converter 211 rotates the polarization of the s-polarized incident light counterclockwise by 90°.

The originally s-polarized but now p-polarized component output from the first nonreciprocal polarization converter 211 is input to the second-order nonlinear optical medium 102, in which, as in the first embodiment, SHG light and SPDC correlated photon pairs are generated. The SHG light and SPDC correlated photon pairs are linearly polarized in the polarization direction of the input excitation light (the p-polarization direction).

The now p-polarized excitation component and the likewise p-polarized SHG light and the SPDC correlated photon pairs generated in the second-order nonlinear optical medium 102 are input to the second nonreciprocal polarization converter 212. The axes of the half-wave plate 210 of the second nonreciprocal polarization converter 212 are also oriented at angles of 22.5° to the p- and s-polarization directions. Operating in the same way as the first nonreciprocal polarization converter 211, the second nonreciprocal polarization converter 212 rotates the polarization plane of the excitation light component and the SPDC correlated photon pair, which have wavelengths near the wavelength of the excitation light, counterclockwise by 90°. The excitation light is thereby converted back to s-polarized light. The photon pairs are also s-polarized.

The excitation light and the SPDC correlated photon pairs propagating on the optical loop LP in the counterclockwise direction are now input to the second input/output port 101-2 of the polarization splitting-combining module 101 and output from the fourth input/output port 101-4 of the polarization splitting-combining module 101 because they are s-polarized. This contrasts with the first embodiment, in which the excitation light and the SPDC correlated photon pair were output from the first input/output port 101-1.

The p-polarized component of the excitation light output from the second input/output port 101-2 of the polarization splitting-combining module 101 propagates on the optical loop LP in the clockwise direction, passing through the second nonreciprocal polarization converter 212, the second-order nonlinear optical medium 102, and the first nonreciprocal polarization converter 211. The variations in the polarization state in the second nonreciprocal polarization converter 212 can also be described with reference to FIG. 9, using reference characters 207 and 208 instead of reference characters 209 and 210.

In FIG. 9B, the p-polarized component indicated by the far right upward-pointing arrow is input to the third half-wave plate 210 and its polarization plane is rotated by 45° in the clockwise direction, as indicated by the 45° upper-right pointing arrow in the center of FIG. 9B, due to the 22.5° angle between its polarization plane and the corresponding optical axis of the third half-wave plate 210. The rotated output light then passes through the second Faraday rotator 209, in which its polarization is rotated by 45° in the counterclockwise direction. Accordingly, the originally p-polarized component is output from the second nonreciprocal polarization converter 212 without change as p-polarized light.

Similarly, no rotation of polarization occurs in passage through the first nonreciprocal polarization converter 211, because of the 22.5° angles between the axes of the half-wave plate and the p- and s-polarization directions.

The p-polarized excitation light output from the second nonreciprocal polarization converter 212 is input to the 102, which generates p-polarized SHG light and p-polarized SPDC correlated photon pairs.

The p-polarized excitation light, the p-polarized SHG light, and the p-polarized SPDC correlated photon pairs output from the second-order nonlinear optical medium 102 pass through the first nonreciprocal polarization converter 211. The p-polarized excitation light and the SPDC correlated photon pairs are output with their polarization states unchanged, then input to the third input/output port 101-3 and output from the fourth input/output port 101-4, where the p-polarized and s-polarized photon pairs are combined to generate polarization entangled photon pairs.

The p-polarized excitation light and the p-polarized SPDC correlated photon pairs propagating on the optical loop LP in the clockwise direction and the s-polarized excitation light and the s-polarized SPDC correlated photon pairs propagating in the counterclockwise direction on the optical loop LP are all output from the fourth input/output port 101-4, with mutually orthogonal polarization directions.

Next the variations in the polarization of the SHG light output from the second-order nonlinear optical medium 102 when passing through the first nonreciprocal polarization converter 211 and the second nonreciprocal polarization converter 212 will be described. At the wavelength ($\lambda_p/2$) of the SHG light, the second half-wave plate 208 in the first nonreciprocal polarization converter 211 and the third half-wave plate 210 in the second nonreciprocal polarization converter 212 are single-wave plates, which cause no rotation of polarization, but a substantially 90° rotation is produced by passage through each of the Faraday rotators 207, 209. The SHG light therefore emerges from the first nonreciprocal polarization converter 211 and second nonreciprocal polarization converter 212 with its plane of polarization rotated by substantially 90°, regardless of its input direction, as shown in FIGS. 9C and 9D.

Figure 10:
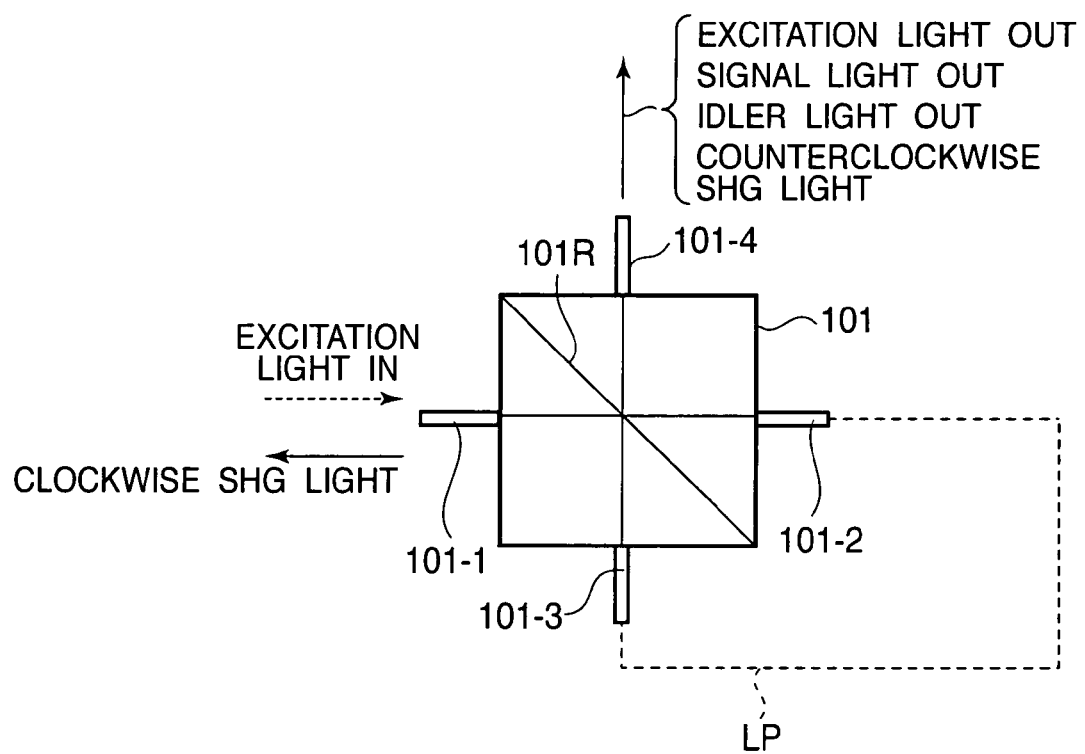
FIG. 10 schematically indicates the input and output ports for excitation light, SHG light, and signal and idler photons in the second embodiment.

As shown in FIG. 10, the desired quantum entangled photon pairs are output from the fourth input/output port 101-4 of the polarization splitting-combining module 101 together with the returning excitation light and the counterclockwise propagating SHG light component. The SHG light component propagating around the optical loop LP in the clockwise direction is input to the third input/output port 101-3 and output from the first input/output port 101-1.

After being output from the fourth input/output port 101-4, as in the first embodiment, the SHG light and excitation light components are removed by the optical low-pass filter 105 and WDM filter 106 and the SPDC correlated photon pairs are separated into signal photons and idler photons and output onto separate optical paths.

Unlike the first embodiment and its variations, the second embodiment does not return any of the excitation light to its original input port (the first input/output port 101-1). Unstable operation of the excitation light source due to reflected light is thereby prevented without the need for an optical circulator, an optical isolator, or some other type of optical element for dealing with returning light, and without the optical loss that would occur in this optical element. The device cost is also lowered.

The second embodiment accordingly provides the effects of the first embodiment and the following additional effect: since no excitation light returns to its original input port, device operation is not destabilized by reflected light, device characteristics are not degraded by optical loss, and the device cost is reduced.

Third Embodiment

Figure 11:
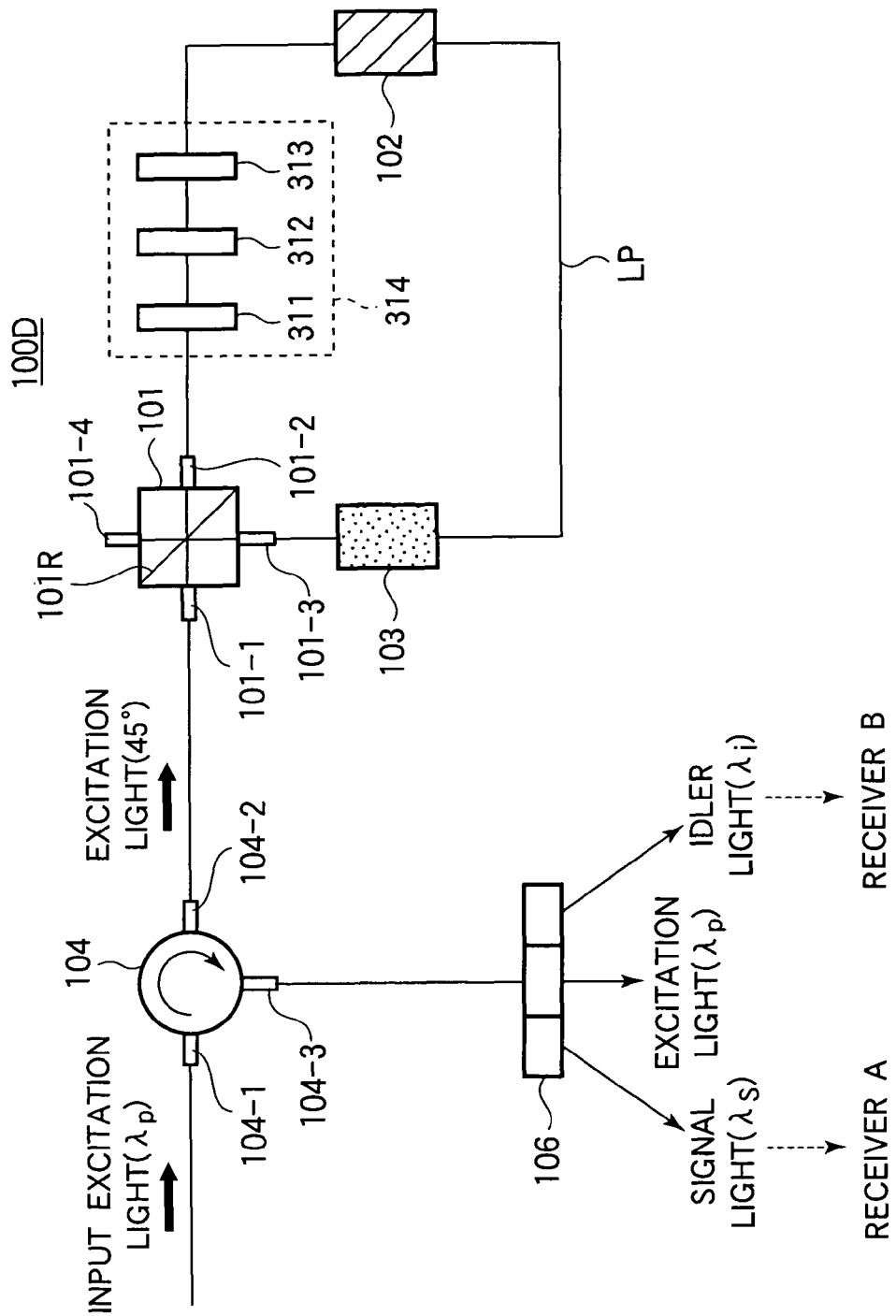
FIG. 11 schematically illustrates the structure of a polarization entangled photon pair generating device in a third embodiment of the invention.

Referring to FIG. 11, the quantum entangled photon pair generating device 100D in the third embodiment is generally similar in structure to the quantum entangled photon pair generating device in the first embodiment, but it lacks the optical low-pass filter of the first embodiment and instead includes a polarization converter 314 between the second input/output port 101-2 of the polarization splitting-combining module 101 and the second-order nonlinear optical medium 102. The polarization converter 314 includes a fourth half-wave plate 311, a quarter-wave plate 312, and a fifth half-wave plate 313 coupled in cascade.

The optical axes of the fourth half-wave plate 311, quarter-wave plate 312, and fifth half-wave plate 313 are aligned as shown in FIG. 12. The optical axes of the fourth half-wave plate 311 and the fifth half-wave plate 313 are rotated clockwise by angles of 22.5° from the p- and s-polarization directions (the p-polarization direction is shown in FIG. 12). The optical axes of the quarter-wave plate 312 make 45° angles to the p- and s-polarization directions.

The polarization splitting-combining module 101, second-order nonlinear optical medium 102, first half-wave plate 103, optical circulator 104, and WDM filter 106 function as in the first embodiment, so descriptions will be omitted.

The operation of the quantum entangled photon pair generating device 100D will now be described.

As in the first embodiment, when excitation light of wavelength $\lambda_p$ is input to the first input/output port 101-1 of the polarization splitting-combining module 101, linearly polarized at a 45° angle to the p- and s-directions of the polarization splitting-combining module 101, it is separated into a p-polarized component output from the second input/output port 101-2 and an s-polarized component output from the third input/output port 101-3, each component having the same optical intensity.

A distinctive effect in the third embodiment, which will be described later, is produced by the wavelength dependency of the polarization converter 314. This will now be described with reference to FIG. 12 and FIGS. 12A to 12D.

FIG. 12A shows the variations in the polarization state of the p-polarized component of the excitation light output from the second input/output port 101-2 in passing through the polarization converter 314.

From the second input/output port 101-2, the p-polarized component of the excitation light, indicated by an upward-pointing arrow at the far left in FIG. 12A, first passes through the fourth half-wave plate 311. Because of the orientation of the optical axes of the fourth half-wave plate 311, this excitation light component leaves the fourth half-wave plate 311 with its polarization plane rotated 45° clockwise from the p-polarization direction, as indicated by the first upper-right pointing arrow in FIG. 12A.

Next this excitation light component, now polarized at an angle of 45° with respect to the p- and s-directions, enters the quarter-wave plate 312. The optical axes of the quarter-wave plate 312 are also oriented at 45° angles to the p- and s-polarization directions, so no polarization rotation occurs as the light passes through the quarter-wave plate 312.

After passing through the quarter-wave plate 312, this excitation light component, still polarized at a 45° angle clockwise from the p-polarization direction, enters the fifth half-wave plate 313. Because of the 22.5° clockwise angle of the optical axes of the fifth half-wave plate 313, the polarization plane of the excitation light is rotated by 45° in the counterclockwise direction and returns to the p-polarization direction, as indicated by the upward-pointing arrow at the far right in FIG. 12A.

The p-polarized component of the excitation light is therefore output from the polarization converter 314 with its original polarization unchanged. Because of the symmetrical structure of the polarization converter 314, the same also holds in the passage of p-polarized light in the opposite direction, as indicated by FIG. 12B.

Next, the variations in the polarization of the SHG light with wavelength $\lambda_p/2$ as it passes through the polarization converter 314 will be described with reference to FIG. 12C and FIG. 12D. FIG. 12C shows the variations in the polarization state of the SHG light propagating clockwise around the optical loop LP. FIG. 12D shows the variations in the polarization state of the SHG light propagating counterclockwise.

At the $\lambda_p/2$ wavelength of the SHG light, the half-wave plates 311 and 313 act as single-wave plates, and the quarter-wave plate 312 acts as a half-wave plate. Accordingly, the p-polarized SHG light propagating counterclockwise passes through the fifth half-wave plate 313 with its polarization unchanged, as indicated by the upward-pointing arrows to the right of center in FIG. 12D, has its polarization plane rotated clockwise by 90° by the quarter-wave plate 312, as by the rightward-pointing arrow to the left of center in FIG. 12D, and passes through the fourth half-wave plate 311 with its polarization unchanged, as indicated by the rightward-pointing arrow at the far left in FIG. 12D.

Therefore, the polarization converter 314 rotates the polarization plane of the $\lambda_p/2$ wavelength SHG light propagating in the counterclockwise direction around the optical loop LP by 90°, so that the SHG light is s-polarized when it leaves the polarization converter 314. Similarly, SHG light propagating clockwise is changed from p-polarization to s-polarization, as shown in FIG. 12C.

To summarize, in passage through the polarization converter 314, the polarization of the excitation light and the SPDC correlated photon pairs, which have wavelengths equal or near to $\lambda_p$, is not rotated, while the polarization plane of the SHG light, which has a wavelength of $\lambda_p/2$, is rotated by 90°. The 22.5° and 45° angles of the optical axes of the optical elements in the polarization converter 314 are selected for the purpose of accomplishing this polarization conversion.

The overall operation of the third embodiment will now be described.

The p-polarized excitation light output from the second input/output port 101-2 and propagating around the optical loop LP in the clockwise direction first passes through the polarization converter 314 with its polarization unchanged and enters the second-order nonlinear optical medium 102, in which p-polarized SHG light and p-polarized SPDC correlated photon pairs are generated as in the first embodiment.

Then in passing through the first half-wave plate 103, the p-polarized excitation light and the SPDC correlated photon pairs have their polarization rotated by 90° and become s-polarized light, while the SHG light is left as p-polarized light. The s-polarized excitation light and SPDC correlated photon pairs and p-polarized SHG light are input to the third input/output port 101-3. The s-polarized excitation light and the s-polarized SPDC correlated photon pairs are output from the first input/output port 101-1, while the p-polarized SHG light is output from the fourth input/output port 101-4.

The s-polarized excitation light output from the third input/output port 101-3 and propagating around the optical loop LP in the counterclockwise direction has its polarization rotated by 90° in the first half-wave plate 103 and is input as p-polarized light to the second-order nonlinear optical medium 102. In the second-order nonlinear optical medium 102, p-polarized SHG light and p-polarized SPDC correlated photon pairs are generated as in the first embodiment.

In passing through the polarization converter 314, the p-polarized excitation light and the SPDC correlated photon pairs are not rotated and are output as p-polarized light, while the SHG light has its polarization rotated by 90° and is output as s-polarized light. The p-polarized excitation light and SPDC correlated photon pairs and the s-polarized SHG light are input to the second input/output port 101-2. The p-polarized excitation light and SPDC correlated photon pairs are output from the first input/output port 101-1, while the s-polarized SHG light is output from the fourth input/output port 101-4.

Figure 13:
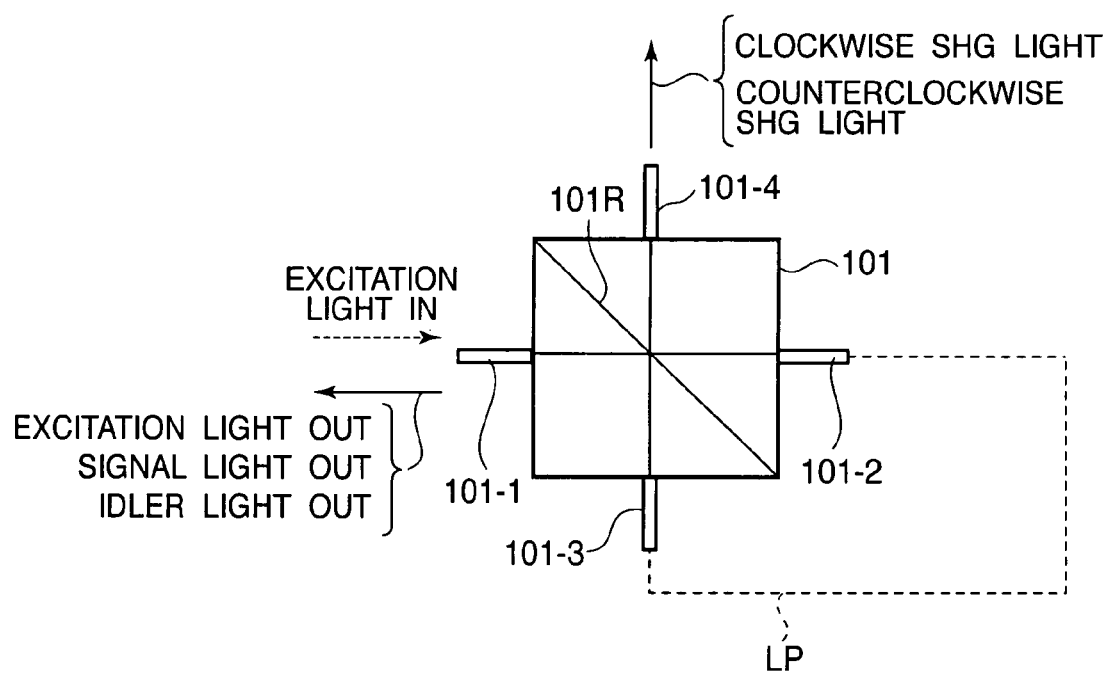
FIG. 13 schematically indicates the input and output ports for excitation light, SHG light, and signal and idler photons in the third embodiment.

The SPDC correlated photon pairs input to the second input/output port 101-2 are p-polarized and the SPDC correlated photon pairs input to the third input/output port 101-3 are s-polarized, so both are led to the first input/output port 101-1 polarization where they combine to form entangled photon pairs consisting of signal and idler photons as shown in FIG. 13. The SHG light is output from the fourth input/output port 101-4. In this way the desired quantum entangled photon pairs and the SHG light are output from separate ports. This structure makes it possible in principle to omit the optical low-pass filter 105 for removing the SHG light, but some SHG light may still leak out through the first input/output port 101-1, and an optical low-pass filter may used to block this leaking SHG light if necessary.

The variations of the first embodiment shown in FIGS. 6 and 7 can also be used in the third embodiment. That is, the optical circulator 104 may be eliminated and the excitation light may be input through the WDM filter 106 as in FIG. 6 or by use of an optical bandpass filter 108 as in FIG. 7. The same effects are obtained as in FIG. 11.

In addition to the effects produced by the first and second embodiments, the third embodiment produces the following effect. In principle, the optical low-pass filter for removing SHG light can be omitted, thereby reducing optical loss on the final output path. In practice, even if the polarization extinction ratio of the SHG light is not sufficiently high in the polarization splitting-combining module 101 and an optical low-pass filter 105 must be used to block residual SHG light, because the polarization splitting-combining module 101 is optimized for wavelength $\lambda_p$ and may not provide an assured polarization extinction ratio at wavelength $\lambda_p/2$, there is less residual SHG light than in the first and second embodiments, so the performance requirements for the optical low-pass filter 105 are relaxed and its cost can be reduced.

Fourth Embodiment

Figure 14:
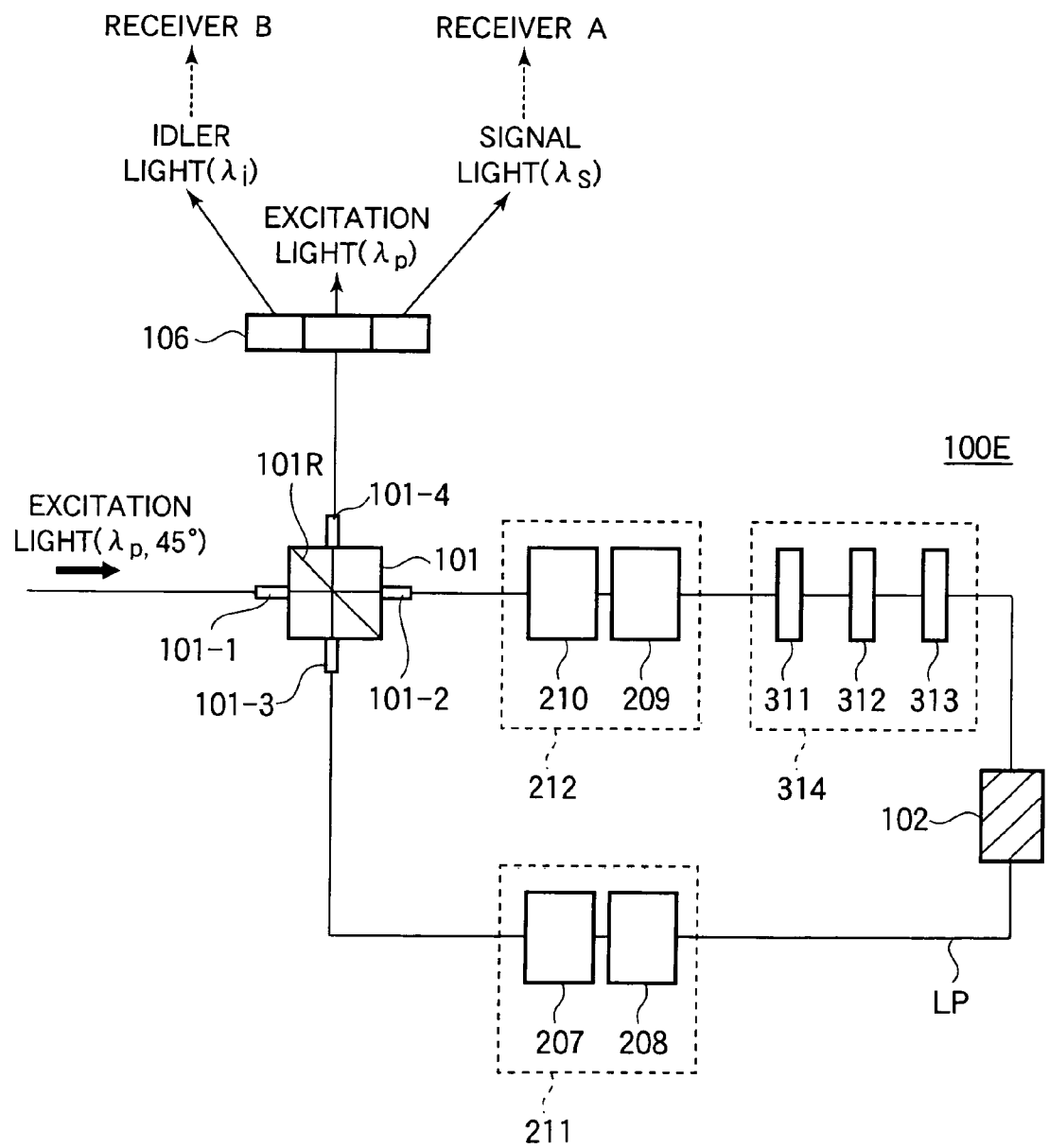
FIG. 14 schematically illustrates the structure of a polarization entangled photon pair generating device in a fourth embodiment of the invention.

Referring to FIG. 14, the fourth embodiment combines the structures of the second and third embodiments. Specifically, the quantum entangled photon pair generating device 100E in the fourth embodiment places the polarization converter 314 of the third embodiment between the second Faraday rotator 209 and the second-order nonlinear optical medium 102 in the second embodiment. The first half-wave plate 103 disposed between the third input/output port 101-3 and the first Faraday rotator 207 in the third embodiment is not used. The optical low-pass filter 105 disposed between the fourth input/output port 101-4 and the WDM filter 106 in the second embodiment is unnecessary in principle, and is not shown in FIG. 14. As in the second embodiment, 45° polarized excitation light is input to the first input/output port 101-1, returning excitation light and SPDC correlated photon pairs generated in the second-order nonlinear optical medium 102 are output from the fourth input/output port 101-4, and SHG light propagating both clockwise and counterclockwise in the optical loop LP is output from the first input/output port 101-1.

Accordingly, the operation of the quantum entangled photon pair generating device 100E in the fourth embodiment can be generally understood from the descriptions of the second and third embodiments.

The p-polarized excitation light output from the second input/output port 101-2 and propagating in the clockwise direction around the optical loop LP passes through the second nonreciprocal polarization converter 212 and the polarization converter 314 with its polarization unchanged and enters the second-order nonlinear optical medium 102. In the second-order nonlinear optical medium 102, p-polarized SHG light and SPDC correlated photon pairs consisting of signal and idler photons are generated and output, together with the p-polarized excitation light, to the first nonreciprocal polarization converter 211. In passing through the first nonreciprocal polarization converter 211, the polarization planes of the p-polarized excitation light and the SPDC correlated photon pairs are not rotated and both are output from the fourth input/output port 101-4 as p-polarized light, while the p-polarized SHG light is converted to s-polarized light and output from the first input/output port 101-1.

In contrast, the s-polarized excitation light output from the third input/output port 101-3 and propagating in the counterclockwise direction on the optical loop LP is converted to p-polarized light in passage through the first nonreciprocal polarization converter 211 and enters the second-order nonlinear optical medium 102. In the second-order nonlinear optical medium 102, p-polarized SHG light and p-polarized SPDC correlated photon pairs are generated and output to the polarization converter 314 together with the p-polarized excitation light. In passage through the polarization converter 314, the polarization planes of the p-polarized excitation light and the p-polarized SPDC correlated photon pairs are not changed and they are output as p-polarized light, while the p-polarized SHG light is rotated by 90° and output as s-polarized light. Then in the second nonreciprocal polarization converter 212, all the polarization planes of the p-polarized excitation light, p-polarized SPDC correlated photon pair, and s-polarized SHG light output form the polarization converter 314 are again rotated by 90°, resulting in output of s-polarized excitation light, s-polarized SPDC correlated photon pair, and p-polarized SHG light to the second input/output port 101-2. The s-polarized excitation light and SPDC correlated photon pair are output from the fourth input/output port 101-4, and the p-polarized SHG light is output from the first input/output port 101-1.

Figure 15:
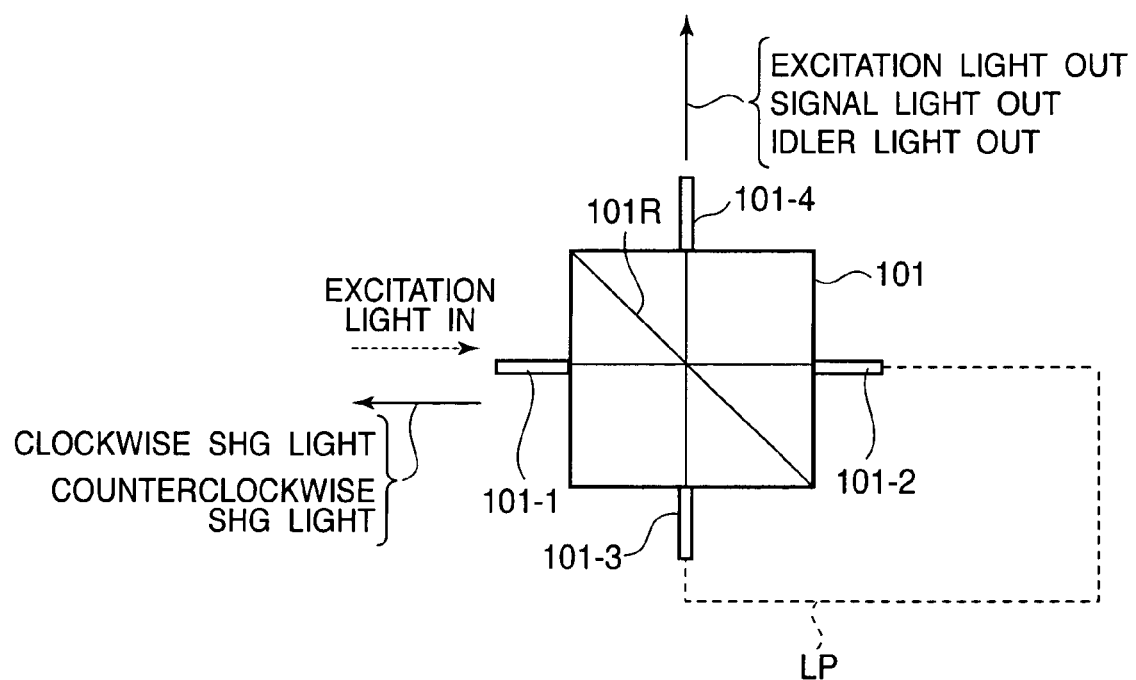
FIG. 15 schematically indicates the input and output ports for excitation light, SHG light, and signal and idler photons in the fourth embodiment.

As shown in FIG. 15, the output ports of the excitation light, SPDC correlated photon pairs, and counterclockwise SHG light are reversed as compared with the third embodiment (FIG. 13).

By combining the effects of the second and third embodiments, the fourth embodiment prevents unstable device operation due to returning excitation light and eliminates or at least reduces the need for an optical low-pass filter for removing SHG light. These features provide a quantum entangled photon pair generating device with high quality and reliability and reduced optical loss.

Fifth Embodiment

Figure 16:
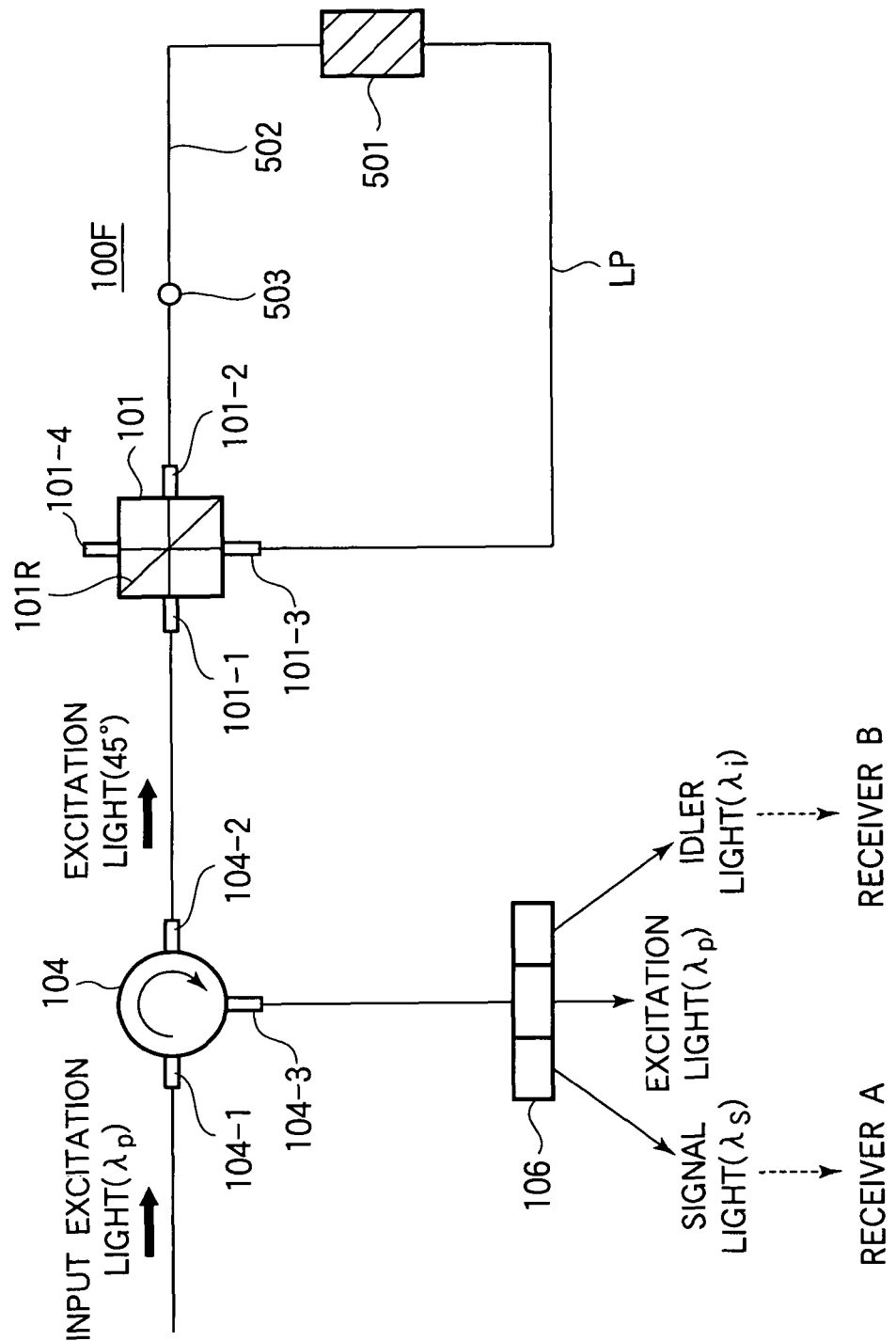
FIG. 16 schematically illustrates the structure of a polarization entangled photon pair generating device in a fifth embodiment of the invention.

Referring to FIG. 16, the quantum entangled photon pair generating device 100F in the fifth embodiment has generally the same structure as in the first embodiment, but it replaces the first half-wave plate with a fiber splice and lacks the optical low-pass filter, which is in principle unnecessary. The fifth embodiment also uses a second-order nonlinear optical medium 501 that differs from the second-order nonlinear optical medium used in the first to fourth embodiments, and uses polarization maintaining optical fiber 502 for at least part of the optical loop LP. The polarization maintaining optical fiber 502 includes a fused splice 503 with a 90° twist, interchanging the fast and slow fiber axes, referred to as a 90° fused splice below.

The excitation light input to the second-order nonlinear optical medium 501 and the SPDC correlated photon pairs output from the second-order nonlinear optical medium 501 are linearly polarized with identical polarization planes, and the SHG light generated in the second-order nonlinear optical medium 501 is linearly polarized with its polarization plane orthogonal to the polarization plane of the excitation light and the SPDC correlated photon pairs.

When a PPLN waveguide is used as the second-order nonlinear optical medium 501, for example, this behavior is obtained by use of PPLN's $d_{31}$ second-order nonlinear optical coefficient for the SHG and SPDC processes and inputting excitation light polarized in the X-axis direction of the PPLN crystal.

The 90° fused splice 503 is prepared as follows. The two ends of the second-order nonlinear optical medium 501 are optically coupled to input/output ports 101-2 and 101-3 of the polarization splitting-combining module 101 to form the optical loop LP. Polarization maintaining optical fiber 502 may be used either on the optical path from the second-order nonlinear optical medium 501 to the second input/output port 101-2 or the optical path from the second-order nonlinear optical medium 501 to the third input/output port 101-3, or on both of these paths. At an intermediate point on one of these two paths, the polarization maintaining optical fiber 502 is cleaved and the two cleaved surfaces are fused with their fast and slow axes interchanged to form the 90° fused splice 503. Alternatively two polarization maintaining optical fibers 502 may be attached to the polarization splitting-combining module 101 and second-order nonlinear optical medium 501, respectively, and their free ends may then be fused to form the 90° fused splice 503.

The path on which the 90° fused splice 503 is formed is a design choice. The path may be selected, as described later, according to the optical axis direction of the second-order nonlinear optical medium 501 and the polarization direction of the excitation light. In FIG. 16, the 90° fused splice 503 is disposed on the optical path between the second-order nonlinear optical medium 501 and the second input/output port 101-2, and the polarization maintaining optical fiber 502 is used for at least this part of the optical loop LP.

As in the first to fourth embodiments, $\lambda_p$ wavelength linear polarized excitation light input to the polarization splitting-combining module 101 is separated into p- and s-polarized components with the same intensity and output from the second input/output port 101-2 and the third input/output port 101-3, propagating in the clockwise and counterclockwise directions on the optical loop LP, respectively.

The second-order nonlinear optical medium 501 is placed so that the s-polarization direction matches the X-axis direction of the PPLN crystal.

The s-polarized excitation light output from the third input/output port 101-3 and propagating in the counterclockwise direction on the optical loop LP enters the second-order nonlinear optical medium 501, in which p-polarized SHG light and s-polarized SPDC correlated photon pairs are generated.

The s-polarized excitation light, the p-polarized SHG light, and the s-polarized SPDC correlated photon pairs output from the second-order nonlinear optical medium 501 enter the polarization maintaining optical fiber 502 and their polarization planes are rotated by 90° in passage through the 90° fused splice 503. Accordingly the excitation light and the SPDC correlated photon pair enter the second input/output port 101-2 as p-polarized light and are output from the first input/output port 101-1. The SHG light enters the second input/output port 101-2 as s-polarized light and is output from the fourth input/output port 101-4.

The p-polarized excitation light output from the second input/output port 101-2 and propagating in the clockwise direction around the optical loop LP enters the polarization maintaining optical fiber 502 and has its polarization rotated by 90° in passage through the 90° fused splice 503, and enters the second-order nonlinear optical medium 501 as s-polarized light. In the second-order nonlinear optical medium 501, p-polarized SHG light and s-polarized SPDC correlated photon pairs are generated and these components are input to the third input/output port 101-3 together with the s-polarized excitation light. The s-polarized excitation light and the s-polarized SPDC correlated photon pairs are output from the first input/output port 101-1 and the p-polarized SHG light is output from the fourth input/output port 101-4.

The SPDC correlated photon pairs include both s-polarized photon pairs produced by the excitation light propagating clockwise and p-polarized photon pairs produced by the excitation light propagating counterclockwise, providing output of polarization entangled photon pairs.

Figure 17:
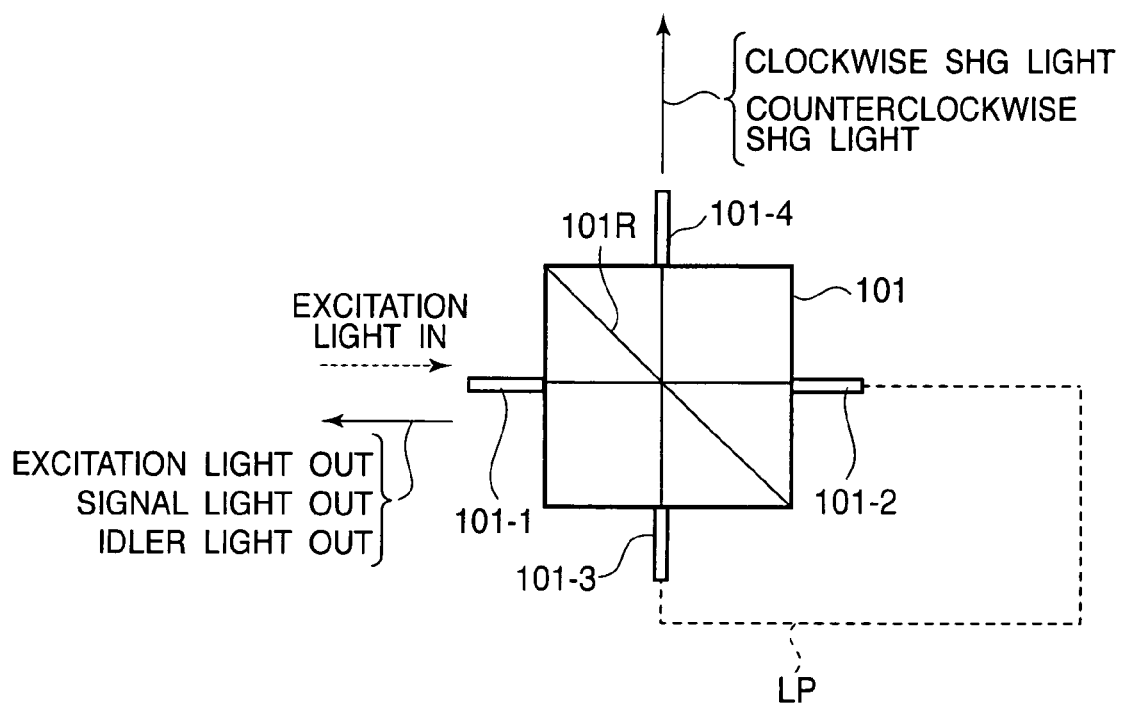
FIG. 17 schematically indicates the input and output ports for excitation light, SHG light, and signal and idler photons in the fifth embodiment.

As schematically shown in FIG. 17, the returning excitation light and desired quantum entangled photon pairs are all output from the first input/output port 101-1 regardless of their directions of propagation around the optical loop LP, while the SHG light is always output from the fourth input/output port 101-4. Therefore, as in the third and fourth embodiments, in principle no optical low-pass filter is necessary.

The fifth embodiment is accordingly a quantum entangled photon pair generating device that eliminates the need for an optical low-pass filter for removing SHG light without using a plurality of optical devices, such as the half-wave and quarter-wave plates used in the third and fourth embodiments. Instead, only an inexpensive polarization maintaining optical fiber with a 90° fused splice is used. Accordingly, a simplified quantum entangled photon pair generating device can be provided at a low cost.

In this embodiment, the second-order nonlinear optical medium 501 is placed so that the X-axis direction of the PPLN crystal matches the s-polarization direction, but the second-order nonlinear optical medium 501 may be placed orthogonally instead, so that the X-axis direction matches the p-polarization direction. In this case, the same effect can be produced if the polarization maintaining optical fiber 502 with the 90° fused splice 503 is located on the optical path from the third input/output port 101-3 to the second-order nonlinear optical medium 501, instead of the optical path from the second input/output port 101-2 to the second-order nonlinear optical medium 501.

The fifth embodiment provides a polarization entangled photon pair generating device requiring no optical low-pass filter for removing SHG light at lower cost and more conveniently than the third and fourth embodiments.

Other Embodiments

In the first to fifth embodiments, a PPLN crystal is used as a second-order nonlinear optical medium, but the same effect can also be produced with other second-order nonlinear optical media, including bulk crystal media, waveguide media having an optical waveguide structure similar to that of a PPLN waveguide, and various other media.

The position of the first half-wave plate 103 on the optical loop LP in the first and third embodiments is a design choice. When the $d_{11}$ component of the second-order nonlinear optical medium is used to produce the effects described in these embodiments, for example, the first half-wave plate 103 may be disposed on the optical path between the second input/output port 101-2 and the second-order nonlinear optical medium 102. The preferred position of the first half-wave plate 103 depends on the orientation of the optical axes of the second-order nonlinear optical medium in relation to the polarization direction of the excitation light. The locations of the polarization converter 314 and the nonreciprocal polarization converters 211 and 212 in the second to fourth embodiments can be selected depending on similar factors.

Those skilled in the art will recognize that further variations are possible within the scope of the invention, which is defined in the appended claims.

What is claimed is:

1. A quantum entangled photon pair generating device comprising:
   a polarization maintaining loop path;
   a loop input unit for receiving excitation light from a first optical path, separating the excitation light into a first excitation light component and a second excitation light component, the first excitation light component and the second excitation light component having mutually orthogonal polarization, feeding the first excitation light component into the polarization maintaining loop path in a clockwise direction, and feeding the second excitation light component into the polarization maintaining loop path in a counterclockwise direction;

a second-order nonlinear optical medium disposed in the polarization maintaining loop path and producing a second-order nonlinear optical effect, for generating first up-converted light from the first excitation light component by second harmonic generation, generating first down-converted light from the first up-converted light by spontaneous parametric down-conversion, generating second up-converted light from the second excitation light component by second harmonic generation, and generating second down-converted light from the second up-converted light by spontaneous parametric down-conversion, the first up-converted light and the first down-converted light propagating on the polarization maintaining loop path in the clockwise direction, the second up-converted light and the second down-converted light propagating on the polarization maintaining loop path in the counterclockwise direction;

a loop output unit for receiving the first down-converted light and the second down-converted light from the polarization maintaining loop path, combining the first down-converted light and the second down-converted light to obtain combined light, and outputting the combined light on a second optical path; and a polarization manipulation unit for manipulating a polarization direction of at least one of the first excitation light component, the second excitation light component, the first down-converted light, and the second down-converted light, thereby causing the loop output unit to output the combined light as polarization entangled light.

2. The quantum entangled photon pair generating device of claim 1, wherein a single polarization splitting-combining module is used as both the loop input unit and the loop output unit.

3. The quantum entangled photon pair generating device of claim 2, wherein the polarization manipulation unit is a first half-wave plate disposed in the polarization maintaining loop path to rotate a plane of polarization of the first down-converted light by ninety degrees.

4. The quantum entangled photon pair generating device of claim 3, wherein the first optical path and the second optical path share a common section, further comprising an optical circulator disposed at one end of the common section.

5. The quantum entangled photon pair generating device of claim 3, wherein the first optical path and the second optical path share a common section, further comprising a first wavelength selective filter disposed at an end of the common section to reflect one of the excitation light and the combined light and transmit another one of the excitation light and the combined light.

6. The quantum entangled photon pair generating device of claim 2, wherein the polarization manipulation unit further comprises:

a first nonreciprocal polarization converter preceding the second-order nonlinear optical medium in the counterclockwise direction on the polarization maintaining loop path, the first nonreciprocal polarization converter including a first Faraday rotator and a second half-wave plate, the first Faraday rotator preceding the second half-wave plate in the counterclockwise direction on the polarization maintaining loop path; and a second nonreciprocal polarization converter following the second-order nonlinear optical medium in the counterclockwise direction on the polarization maintaining loop path, the second nonreciprocal polarization converter including a second Faraday rotator and a third half-wave plate, the second Faraday rotator preceding the third half-wave plate in the counterclockwise direction on the polarization maintaining loop path.

7. The quantum entangled photon pair generating device of claim 2, wherein the polarization manipulation unit further comprises:

a first half-wave plate following the second-order nonlinear optical medium in the clockwise direction on the polarization maintaining loop path; and a polarization converter preceding the second-order nonlinear optical medium in the clockwise direction on the polarization maintaining loop path, the polarization converter including a fourth half-wave plate, a quarter-wave plate following the fourth half-wave plate in the clockwise direction on the polarization maintaining loop path, and a fifth half-wave plate following the quarter-wave plate in the clockwise direction on the polarization maintaining loop path.

8. The quantum entangled photon pair generating device of claim 7, wherein the first optical path and the second optical path share a common section, further comprising an optical circulator disposed at one end of the common section.

9. The quantum entangled photon pair generating device of claim 7, wherein the first optical path and the second optical path share a common section, further comprising a first wavelength selective filter disposed at an end of the common section to reflect one of the excitation light and the combined light and transmit another one of the excitation light and the combined light.

10. The quantum entangled photon pair generating device of claim 2, wherein the polarization manipulation unit further comprises:

a first nonreciprocal polarization converter preceding the second-order nonlinear optical medium in the counterclockwise direction on the polarization maintaining loop path, the first nonreciprocal polarization converter including a first Faraday rotator and a second half-wave plate, the first Faraday rotator preceding the second half-wave plate in the counterclockwise direction on the polarization maintaining loop path;

a second nonreciprocal polarization converter following the second-order nonlinear optical medium in the counterclockwise direction on the polarization maintaining loop path, the second nonreciprocal polarization converter including a second Faraday rotator and a third half-wave plate, the second Faraday rotator preceding the third half-wave plate in the counterclockwise direction on the polarization maintaining loop path; and a polarization converter disposed between the second nonreciprocal polarization converter and the second-order nonlinear optical medium on the polarization maintaining loop path, the polarization converter including a fourth half-wave plate, a quarter-wave plate following the fourth half-wave plate in the clockwise direction on the polarization maintaining loop path, and a fifth half-wave plate following the quarter-wave plate in the clockwise direction on the polarization maintaining loop path.

11. The quantum entangled photon pair generating device of claim 2, wherein the polarization maintaining loop path comprises a pair of polarization maintaining optical fibers with respective fast and slow axes and the polarization manipulation unit comprises a fused splice between respective ends of the pair of polarization maintaining optical fibers with a ninety-degree shift of the fast and slow axes at the fused splice.

12. The quantum entangled photon pair generating device of claim 11, wherein the first optical path and the second optical path share a common section, further comprising an optical circulator disposed at one end of the common section.

13. The quantum entangled photon pair generating device of claim 11, wherein the first optical path and the second optical path share a common section, further comprising a first wavelength selective filter disposed at an end of the common section to reflect one of the excitation light and the combined light and transmit another one of the excitation light and the combined light.

14. The quantum entangled photon pair generating device of claim 1, further comprising a second wavelength selective filter having two output ports, disposed on the second optical path to reject the excitation light, output a signal wavelength component of the combined light from one of the two output ports, and output an idler wavelength component of the combined light from another one of the two output ports.

15. The quantum entangled photon pair generating device of claim 14, wherein the second wavelength selective filter comprises an arrayed waveguide grating.

16. The quantum entangled photon pair generating device of claim 1, further comprising an optical low-pass filter disposed on the second optical path to reject at least one of the first up-converted light and the second up-converted light.

* * * * *